US012473745B2

(12) United States Patent
Shikata et al.

(10) Patent No.: US 12,473,745 B2
(45) Date of Patent: Nov. 18, 2025

(54) ELECTRONIC LOCK MOUNTING STRUCTURE

(71) Applicant: MINEBEA MITSUMI Inc., Nagano (JP)

(72) Inventors: Yasumasa Shikata, Osaka (JP); Tetsuya Yamamoto, Tokyo (JP); Shinsuke Shoji, Nagano (JP); Shigeru Iwase, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 172 days.

(21) Appl. No.: 18/262,805

(22) PCT Filed: Feb. 8, 2022

(86) PCT No.: PCT/JP2022/004968

§ 371 (c)(1),
(2) Date: Jul. 25, 2023

(87) PCT Pub. No.: WO2022/172928

PCT Pub. Date: Aug. 18, 2022

(65) Prior Publication Data

US 2024/0102314 A1 Mar. 28, 2024

(30) Foreign Application Priority Data

Feb. 12, 2021 (JP) ................................ 2021-020333
Apr. 21, 2021 (JP) ................................ 2021-072205
Jul. 29, 2021 (JP) ................................ 2021-124163

(51) Int. Cl.
*E05B 9/08* (2006.01)

(52) U.S. Cl.
CPC .................................... *E05B 9/08* (2013.01)

(58) Field of Classification Search
CPC ...... E05B 9/08; E05B 1/0007; E05B 15/0046; E05B 15/02; E05B 63/0056;
(Continued)

(56) References Cited

U.S. PATENT DOCUMENTS 3,503,233 A * 3/1970 Armstrong ............. E05B 9/084
70/451
4,305,611 A * 12/1981 Robins ................ E05B 65/0007
292/DIG. 60

(Continued)

FOREIGN PATENT DOCUMENTS

DE 1155998 B * 10/1963
DE 102017127982 A1 * 5/2019 ............. E05B 15/02

(Continued)

OTHER PUBLICATIONS

International Search Report of Int. Appl. No. PCT/JP2022/004968 dated Mar. 29, 2022.

*Primary Examiner* — Carlos Lugo
(74) *Attorney, Agent, or Firm* — IPUSA, PLLC

(57) ABSTRACT

An electronic lock mounting structure is disposed between an electronic lock and a door to mount the electronic lock on the door. The electronic lock mounting structure includes an attachment and a base. The electronic lock mounting structure includes an engagement mechanism configured to engage with a thumb-turn mounting hole provided in the door. The engagement mechanism may include three claw portions configured to engage the thumb-turn mounting hole.

11 Claims, 25 Drawing Sheets

(58) Field of Classification Search
CPC ..... E05B 2047/0091; E05B 2047/0094; E05B 13/001; Y10S 292/53; Y10S 292/54; Y10S 292/60; Y10S 292/64; Y10S 70/73; Y10T 292/03; Y10T 292/707; Y10T 292/85; Y10T 292/858; Y10T 292/865; Y10T 292/873; Y10T 292/88; Y10T 292/91
USPC ............................................................ 70/211
See application file for complete search history.

(56) References Cited

U.S. PATENT DOCUMENTS 4,619,123 A * 10/1986 Hill ..................... E05B 17/2084 70/417
5,369,971 A * 12/1994 Sheppard .............. E05B 13/001 70/416
6,357,808 B1 * 3/2002 Supernat ................. E05B 9/082 16/415
7,373,795 B2 * 5/2008 Kilbourne .......... G07C 9/00309 70/462
8,869,574 B2 * 10/2014 Schmidt-Lackner ........................ E05B 47/068 70/277
8,960,740 B2 * 2/2015 Huang .................... E05B 9/002 292/357
9,809,996 B2 * 11/2017 Ohl ........................... E05B 9/08
10,087,656 B1 * 10/2018 Cannella ............. E05B 63/0004
2008/0296912 A1 * 12/2008 Whitner .............. E05B 47/0012 292/144
2017/0002586 A1 * 1/2017 Lee ......................... E05B 39/00
2018/0061163 A1 3/2018 Ku

FOREIGN PATENT DOCUMENTS

JP 2005-264444 9/2005
JP 2013-209882 10/2013
JP 6060471 1/2017
JP 2018-035658 3/2018
KR 10-2015-0146310 12/2015

* cited by examiner

FIG.16A1
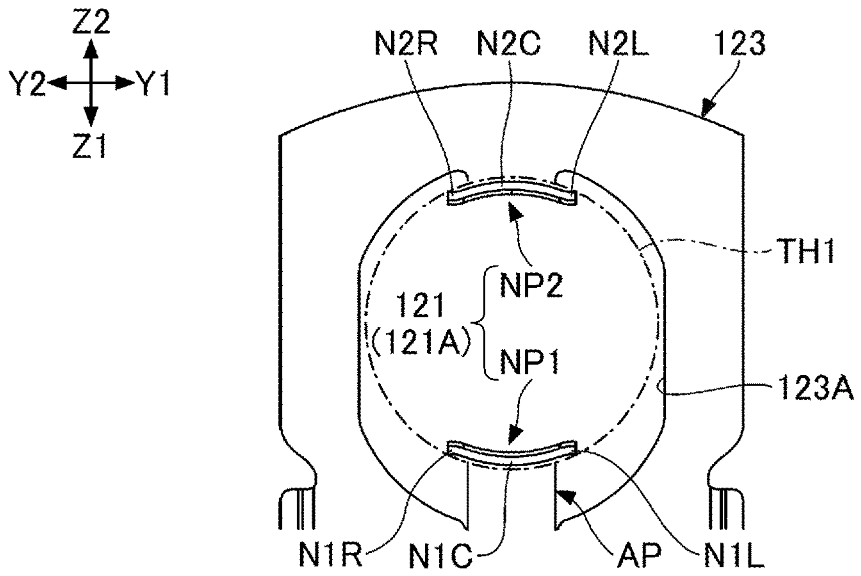
FIG.16A2
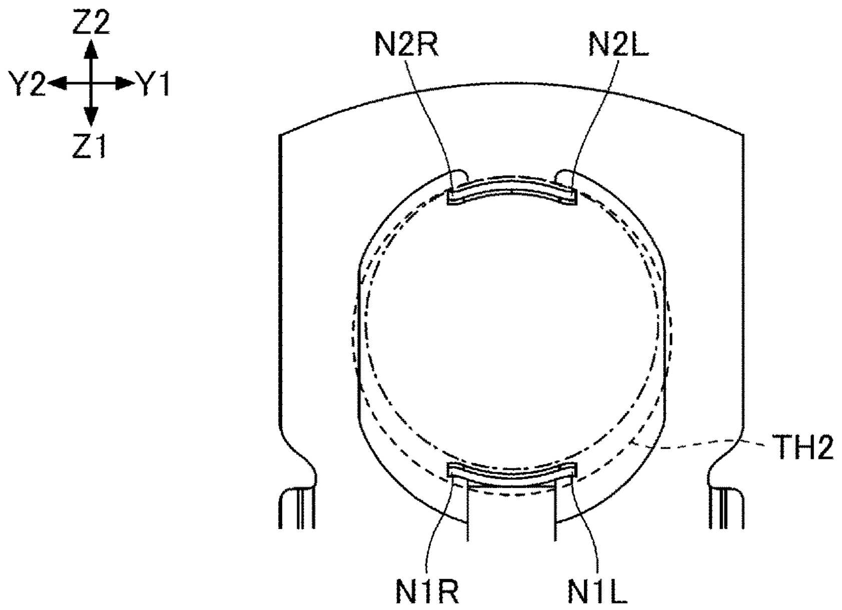

FIG.16A3
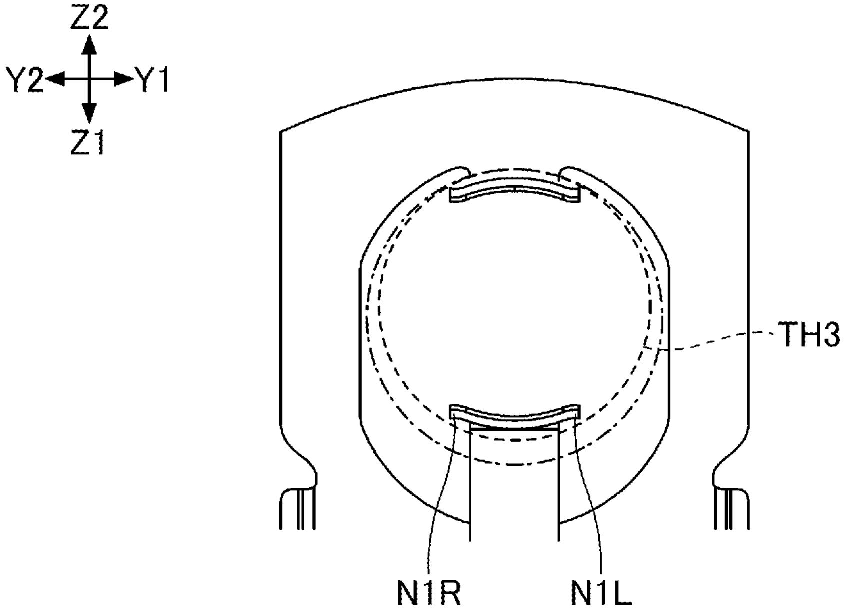
FIG.16B1
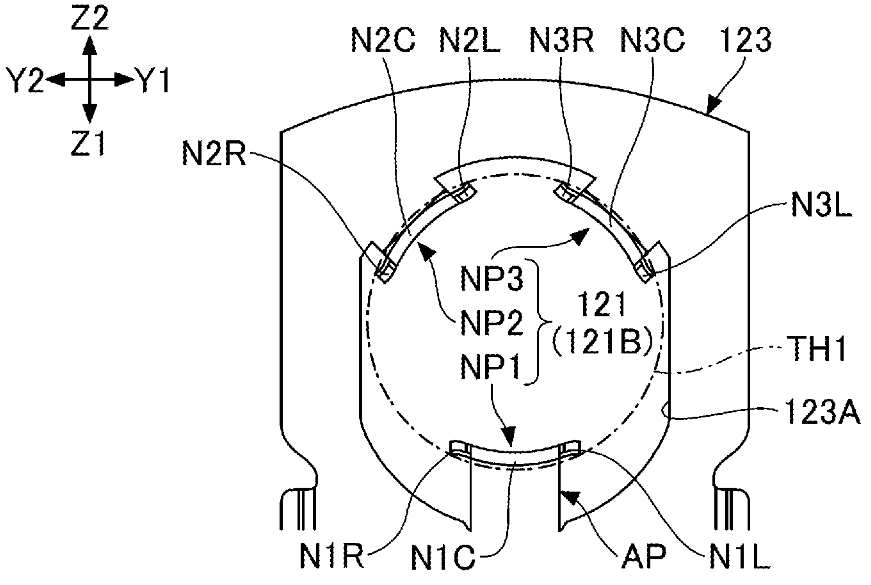

FIG.16B2
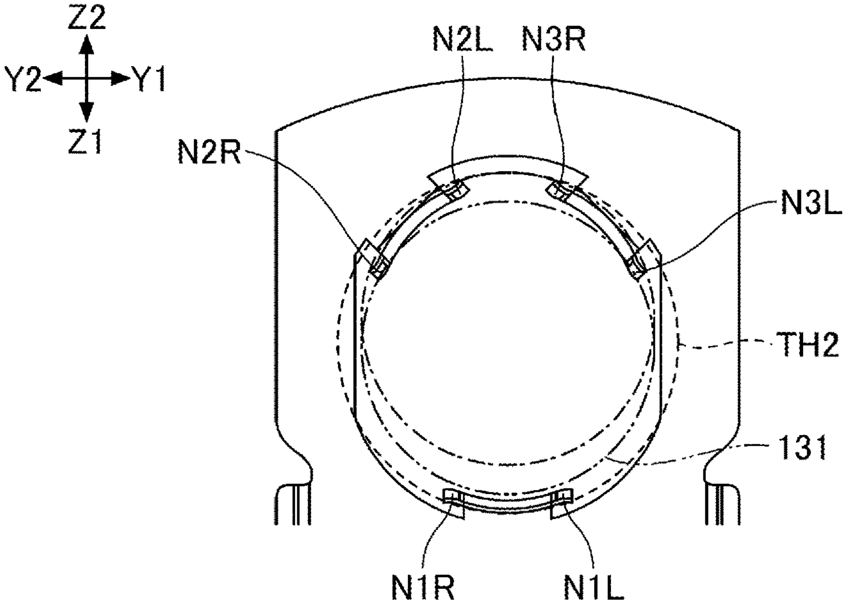
FIG.16B3
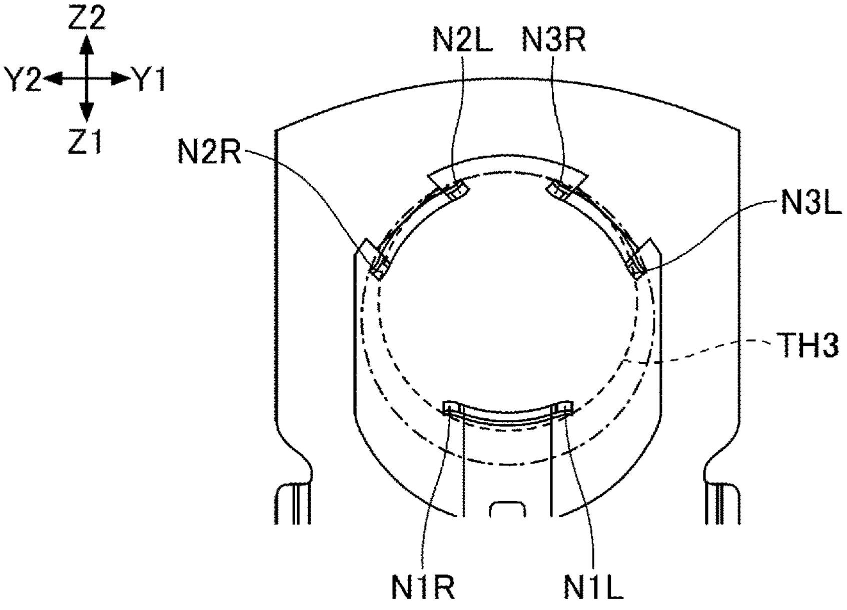

ELECTRONIC LOCK MOUNTING STRUCTURE

TECHNICAL FIELD

The present disclosure relates to an electronic lock mounting structure.

BACKGROUND

Conventionally, a retrofit type electronic lock that includes a holding mechanism that can hold a knob of a thumb-turn, and that operates the thumb-turn by turning the holding mechanism with a motor while holding the knob is known (see Patent Document 1).

RELATED-ART DOCUMENT

Patent Document

Patent Document 1: Japanese Patent No. 6060471

SUMMARY

Problem to be Solved by the Invention

The conventional electronic lock is fixed to a door via a strong double-sided tape. Therefore, when the electronic lock is removed from the door, the double-sided tape remains attached to the surface of the door. In this case, an operator may damage the door when peeling off the double-sided tape remaining attached to the surface of the door.

An electronic lock mounting structure that allows an electronic lock to be removed from a door without damaging a surface of the door is preferably provided.

Means for Solving the Problem

An electronic lock mounting structure according to an embodiment of the present disclosure is an electronic lock mounting structure that is disposed between an electronic lock and a door to mount the electronic lock on the door, and includes an engagement mechanism configured to engage with a thumb-turn mounting hole provided in the door.

Effect of the Invention

An electronic lock mounting structure can remove an electronic lock from a door without damaging a surface of the door.

BRIEF DESCRIPTION OF THE DRAWINGS

FIG. 16A1 is a bottom view of the engagement mechanism including two claw portions.

FIG. 16A2 is a bottom view of the engagement mechanism including two claw portions.

FIG. 16A3 is a bottom view of the engagement mechanism including two claw portions.

FIG. 16B1 is a bottom view of the engagement mechanism including three claw portions.

FIG. 16B2 is a bottom view of the engagement mechanism including three claw portions.

FIG. 16B3 is a bottom view of the engagement mechanism including three claw portions.

DESCRIPTION OF EMBODIMENTS

An electronic lock unit 10 including an electronic lock mounting structure FS according to an embodiment of the present disclosure will be described below. In each drawing, the same components will be assigned the same reference signs and may in some cases not be described in a redundant manner.

Figure 1A:
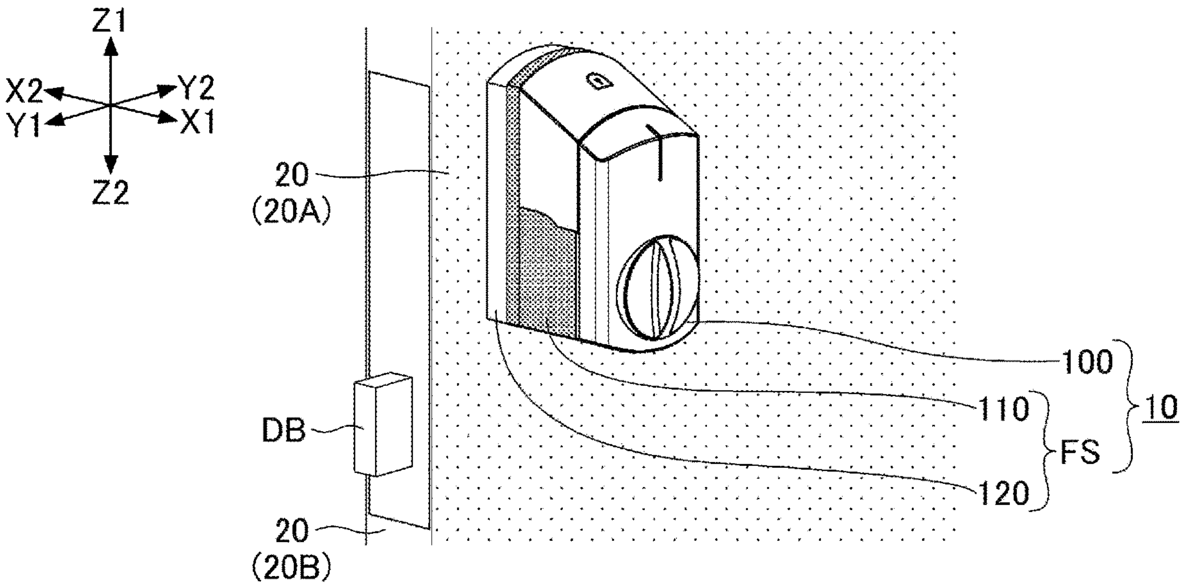
FIG. 1A is a front perspective view of a configuration example of an electronic lock unit.
Figure 1B:
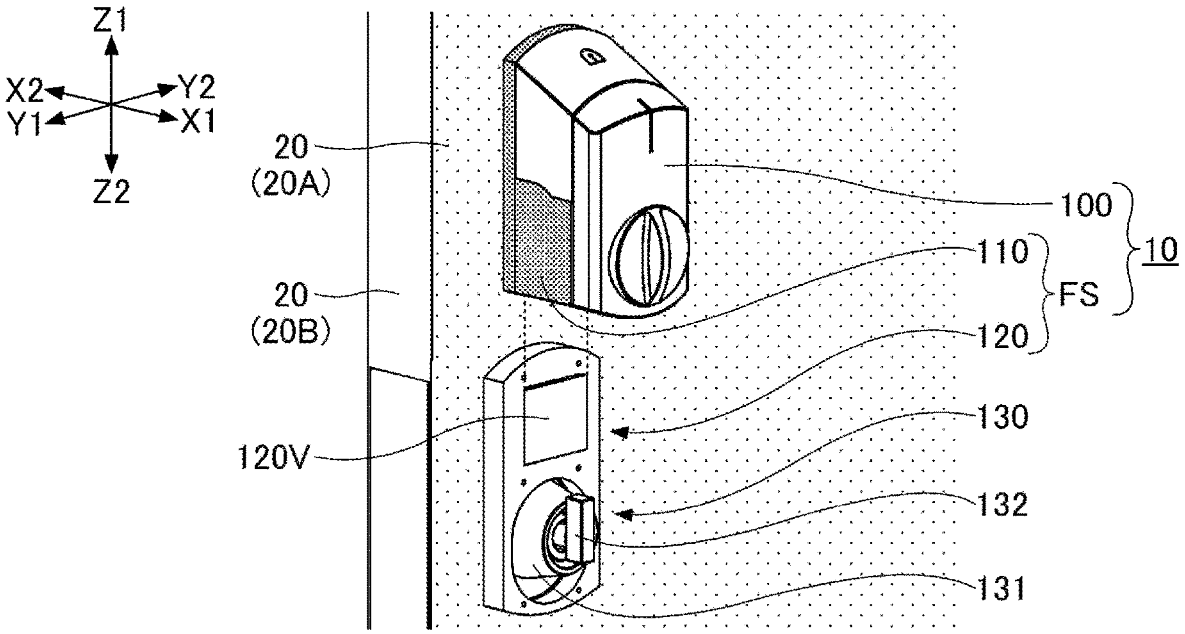
FIG. 1B is a front perspective view of a configuration example of the electronic lock unit.
Figure 1C:
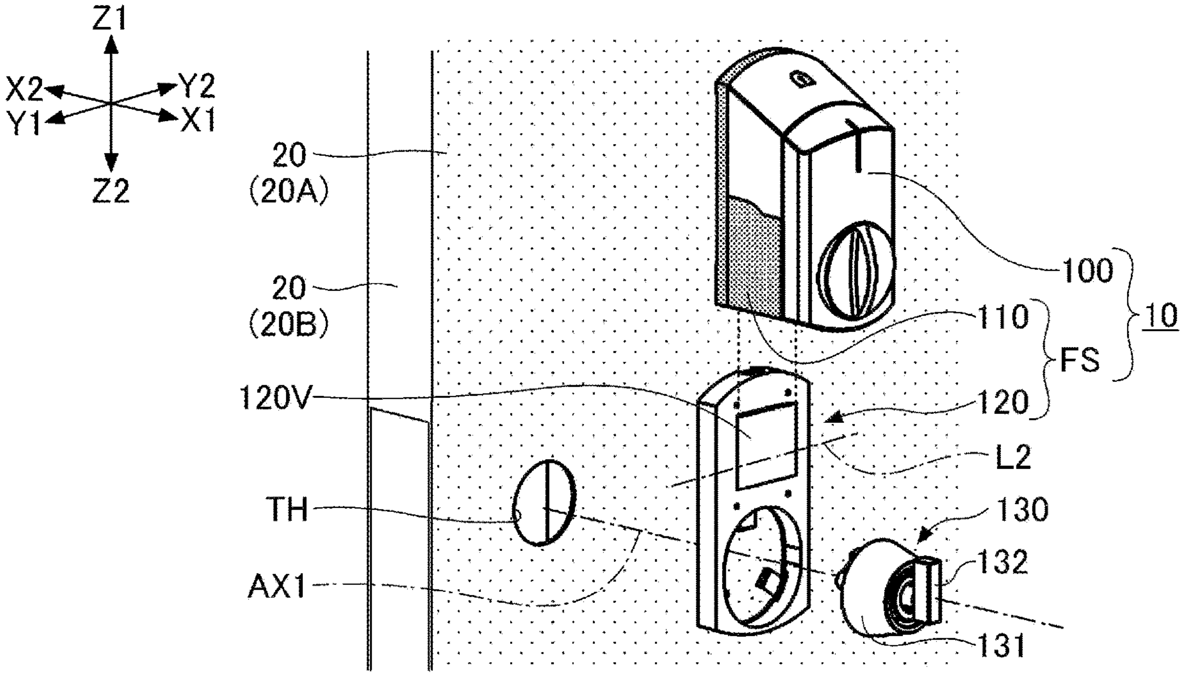
FIG. 1C is a front perspective view of a configuration example of the electronic lock unit.
Figure 2:
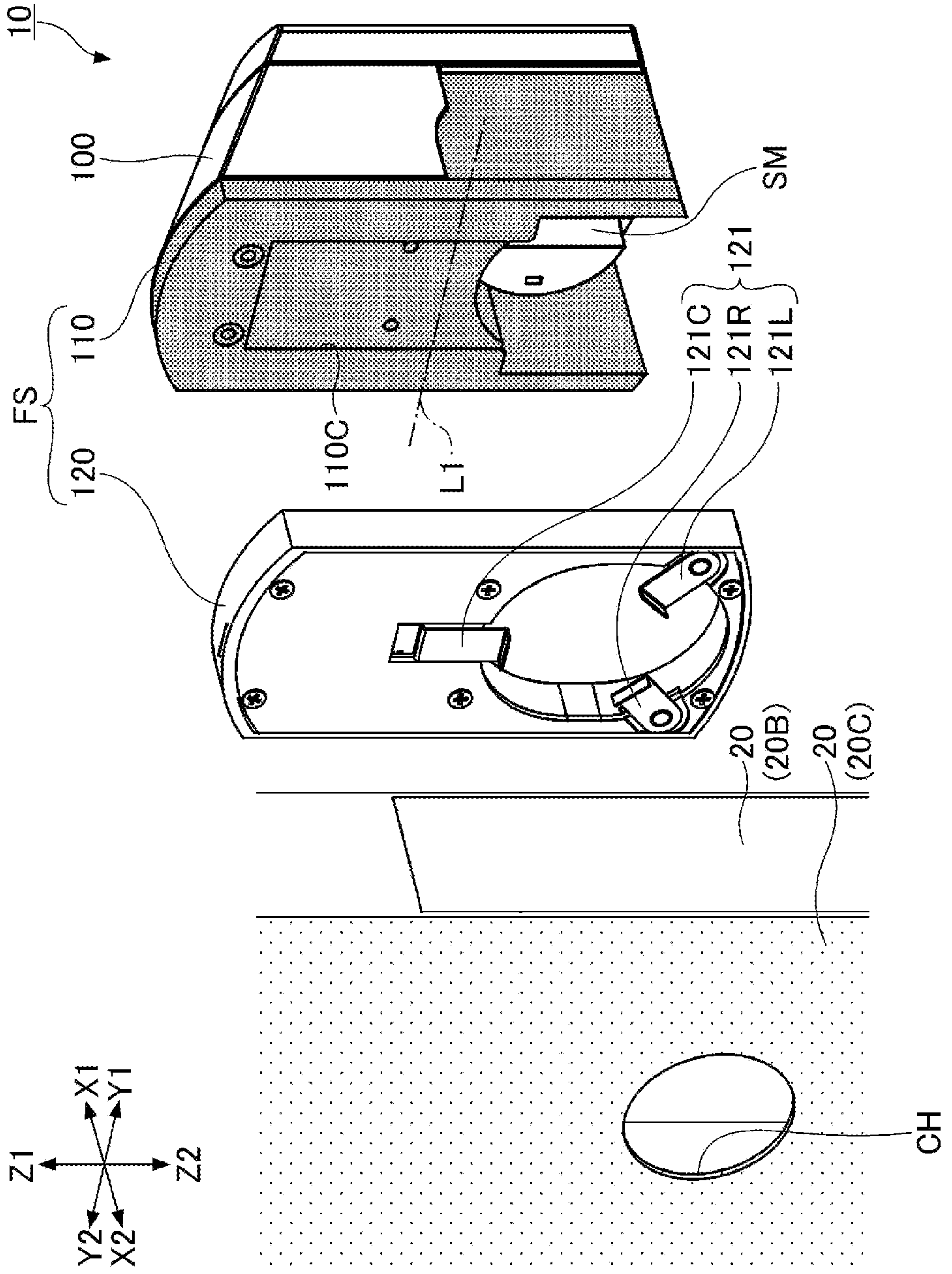
FIG. 2 is a rear perspective view of a configuration example of the electronic lock unit.

FIG. 1A to FIG. 1C are perspective views of the electronic lock unit 10 viewed from the front side. FIG. 2 is a perspective view of the electronic lock unit 10 viewed from the rear side. The electronic lock unit 10 includes an electronic lock 100, an attachment 110, and a base 120. In the present embodiment, the attachment 110 and the base 120 constitute the electronic lock mounting structure FS for mounting the electronic lock 100 to a door 20. However, the attachment 110 may be omitted. In this case, the electronic lock 100 may be directly fixed to the base 120 by a double-sided tape or the like. Further, the attachment 110 may be integrated with the electronic lock 100, or may be integrated with the base 120.

Specifically, FIG. 1A illustrates the electronic lock unit 10 in a state of being mounted to a surface 20A on the indoor-side of the door 20. FIG. 1B illustrates a state of the electronic lock unit 10 when the electronic lock 100 and the attachment 110 are removed together from the base 120 mounted to the surface 20A of the door 20. FIG. 1C illustrates a state of the electronic lock unit 10 when the base 120 and a thumb-turn device 130 are separately removed from the surface 20A of the door 20. FIG. 2 illustrates a state of the electronic lock unit 10 removed from the door 20. FIG. 2 also illustrates a state of the electronic lock unit 10 when the base 120 is removed from the attachment 110 mounted to the electronic lock 100. Note that FIG. 2 further illustrates a cylinder mounting hole CH provided on a surface 20C on the outdoor-side of the door 20.

In each of FIG. 1A to FIG. 1C and FIG. 2, X1 represents one direction of the X-axis constituting the three-dimensional orthogonal coordinate system, and X2 represents the other direction of the X-axis. Y1 represents one direction of the Y-axis constituting the three-dimensional orthogonal coordinate system, and Y2 represents the other direction of the Y-axis. Similarly, Z1 represents one direction of the Z-axis constituting the three-dimensional orthogonal coordinate system, and Z2 represents the other direction of the Z-axis. In FIG. 1A to FIG. 1C and FIG. 2, the side of the electronic lock unit in the X1 direction corresponds to the front side (front surface side) of the electronic lock unit 10, and the side of the electronic lock unit in the X2 direction corresponds to the rear side (back surface side) of the electronic lock unit 10. The side of the electronic lock unit 10 in the Y1 direction corresponds to the left side of the electronic lock unit 10, and the side of the electronic lock unit 10 in the Y2 direction corresponds to the right side of the electronic lock unit 10. The side of the electronic lock unit 10 in the Z1 direction corresponds to the upper side of the electronic lock unit 10, and the side of the electronic lock unit 10 in the Z2 direction corresponds to the lower side of the electronic lock unit 10. The same applies to other members in other drawings.

The electronic lock unit 10 enables locking and unlocking of the door 20 using the thumb-turn device 130 by turning the thumb-turn device 130 provided on the door 20 by remote control via wireless communication (for example, Bluetooth (registered trademark), Wi-Fi (registered trademark), or the like) between various wireless devices (for example, a smartphone, a remote controller, or the like) and the electronic lock unit 10.

The thumb-turn device 130 includes a base 131 and a knob 132 as illustrated in FIG. 1B and FIG. 1C. The base 131 is fixed to the door 20 in a state of protruding from the surface 20A to the indoor de through a thumb-turn mounting hole TH provided on the surface 20A on the indoor-side of the door 20. FIG. 1C illustrates a state in which the thumb-turn mounting hole TH provided on the surface 20A of the door 20 is exposed. The knob 132 is configured to be able to turn with respect to the base 131 about an axis AX1 extending in a direction orthogonal to the surface 20A of the door 20.

A dead bolt DB disposed on a side end face 20B of the door 20 is configured to protrude from the side end face 20B or retract from the side end face 20B in response to the turn of the knob 132. The door 20 is locked by the dead bolt DB protruding from the side end face 20B, and the door 20 is unlocked by the dead bolt DB retracting from the side end face 20B. FIG. 1A illustrates a state where the dead bolt DB protrudes from the side end face 20B, that is, a state where the door 20 is locked. Thus, the door 20 is configured to switch between the locked state and the unlocked state in response to the turn of the knob 132.

The electronic lock 100 is configured to operate in response to remote operations of various wireless devices. Specifically, the electronic lock 100 includes a holding mechanism SM (see FIG. 2) that holds the knob 132 of the thumb-turn device 130, and an electric motor (not illustrated) for turning the holding mechanism SM (knob 132) about the axis AX1. The electronic lock 100 is mounted to the door 20 via the attachment 110 and the base 120. Specifically, the electronic lock 100 is mounted to the attachment 110 by any means such as double-sided tape, screwing, snap-fitting, or slide-fitting. In the examples illustrated from FIG. 1A to FIG. 1C, the electronic lock 100 is detachably mounted to the attachment 110 by slide-fitting.

The attachment 110 is a member for mounting the electronic lock 100 to the base 120. In the present embodiment, the attachment 110 is made of resin. The attachment 110 is mounted to the base 120 by any means such as double-sided tape, screwing, snap-fitting, or slide-fitting. In the examples illustrated in FIG. 1A to FIG. 1C, the attachment 110 is detachably mounted to the base 120 by slide-fitting. Specifically, as illustrated in FIG. 1B and FIG. 1C, the base 120 has a protruding portion 120V formed to protrude forward (in the X1 direction) from the front surface (the surface on the side in the X1 direction). As illustrated in FIG. 2, the attachment 110 has a recessed portion 110C formed to be recessed forward (in the X1 direction) on the rear surface (the surface on the side in the X2 direction). The protruding portion 120V of the base 120 and the recessed portion 110C of the attachment 110 are configured to engage with each other by slide-fitting.

Figure 3A:
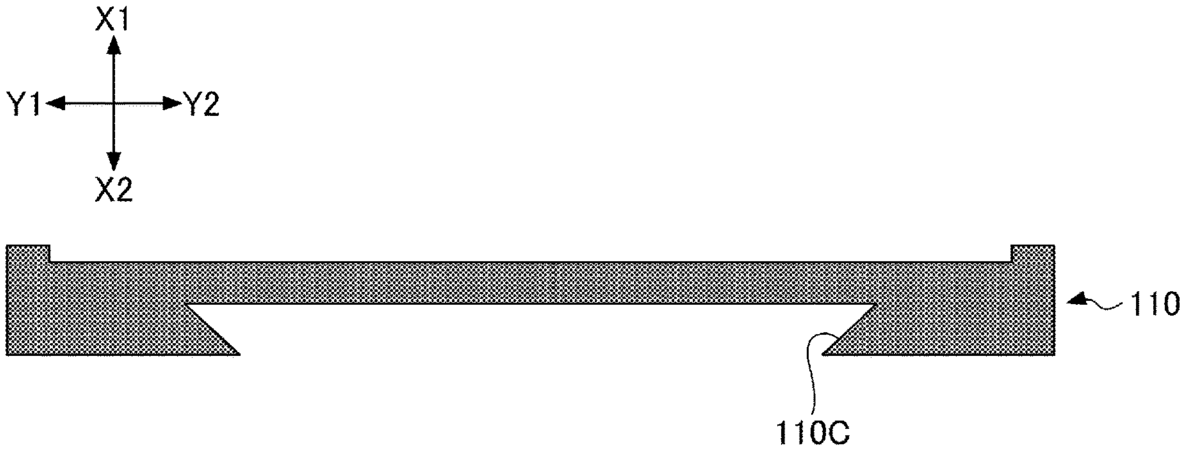
FIG. 3A is a cross-sectional view of a recessed portion of an attachment.
Figure 3B:
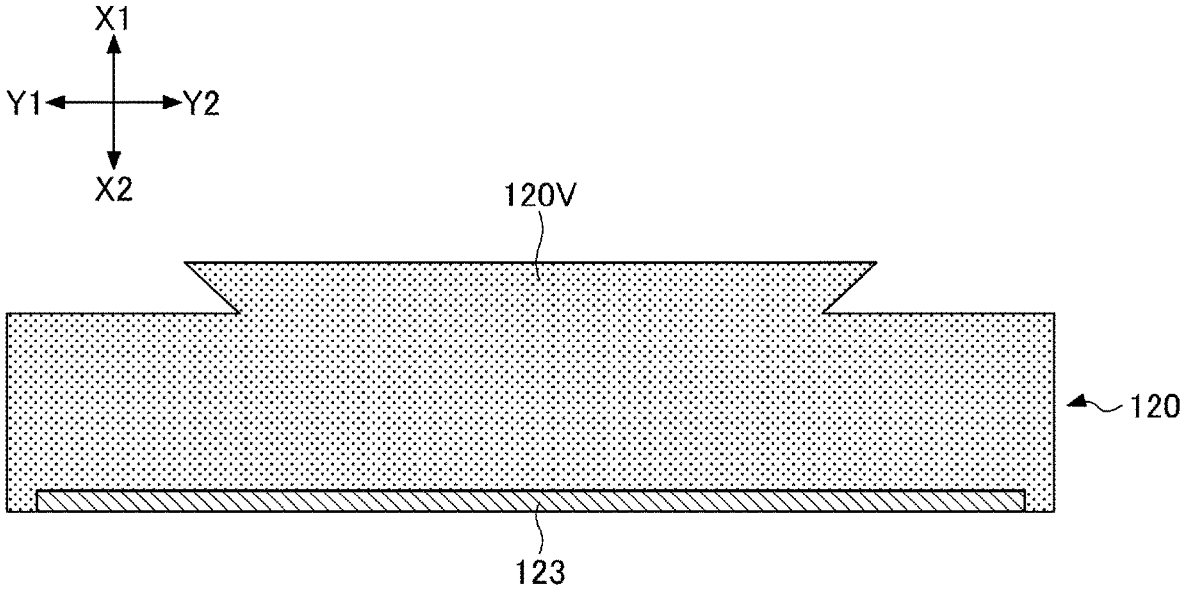
FIG. 3B is a cross-sectional view of a protruding portion of a base.
Figure 3C:
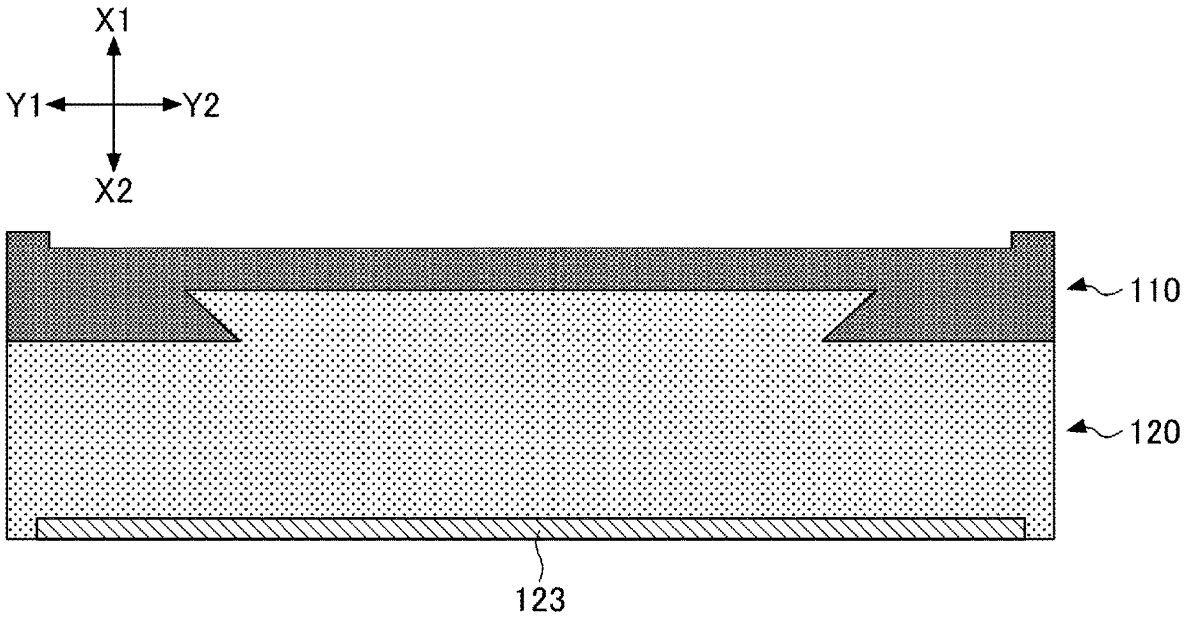
FIG. 3C is a cross-sectional view of the protruding portion of the base and the recessed portion of the attachment.

FIG. 3A to FIG. 3C are cross-sectional views of the protruding portion 120V of the base 120 and the recessed portion 110C of the attachment 110. Specifically, FIG. 3A illustrates a cross-section of the attachment 110 in a plane parallel to the XY plane including a dashed-and-dotted line L1 in FIG. 2. FIG. 3B illustrates a cross-section of the base 120 in a plane parallel to the XY plane including a dashed-and-dotted line L2 in FIG. 1C. FIG. 3C illustrates cross-sections of the attachment 110 and the base 120 when the recessed portion 110C of the attachment 110 and the protruding portion 120V of the base 120 are engaged with each other.

In the examples illustrated in FIG. 3A to FIG. 3C, the protruding portion 120V of the base 120 has a dovetail cross-section. The recessed portion 110C of the attachment 110 is configured to have a shape matching the shape of the protruding portion 120V having the dovetail cross-section. As illustrated in FIG. 2, the lower end (the end portion on the side in the Z2 direction) of the recessed portion 110C of the attachment 110 is open so as to be able to receive the protruding portion 120V of the base 120. Similarly, the upper end (the end portion on the side in the Z1 direction) of the recessed portion 110C of the attachment 110 is configured to have an upper wall portion that comes into contact with the upper end of the protruding portion 120V of the base 120. With this configuration, the operator can mount the attachment 110 to the base 120 by positioning the attachment 110 above the base 120 as illustrated in FIG. 1B and then sliding the attachment 110 downward in a state where the rear surface of the attachment 110 is in contact with the front surface of the base 120.

Figure 4A:
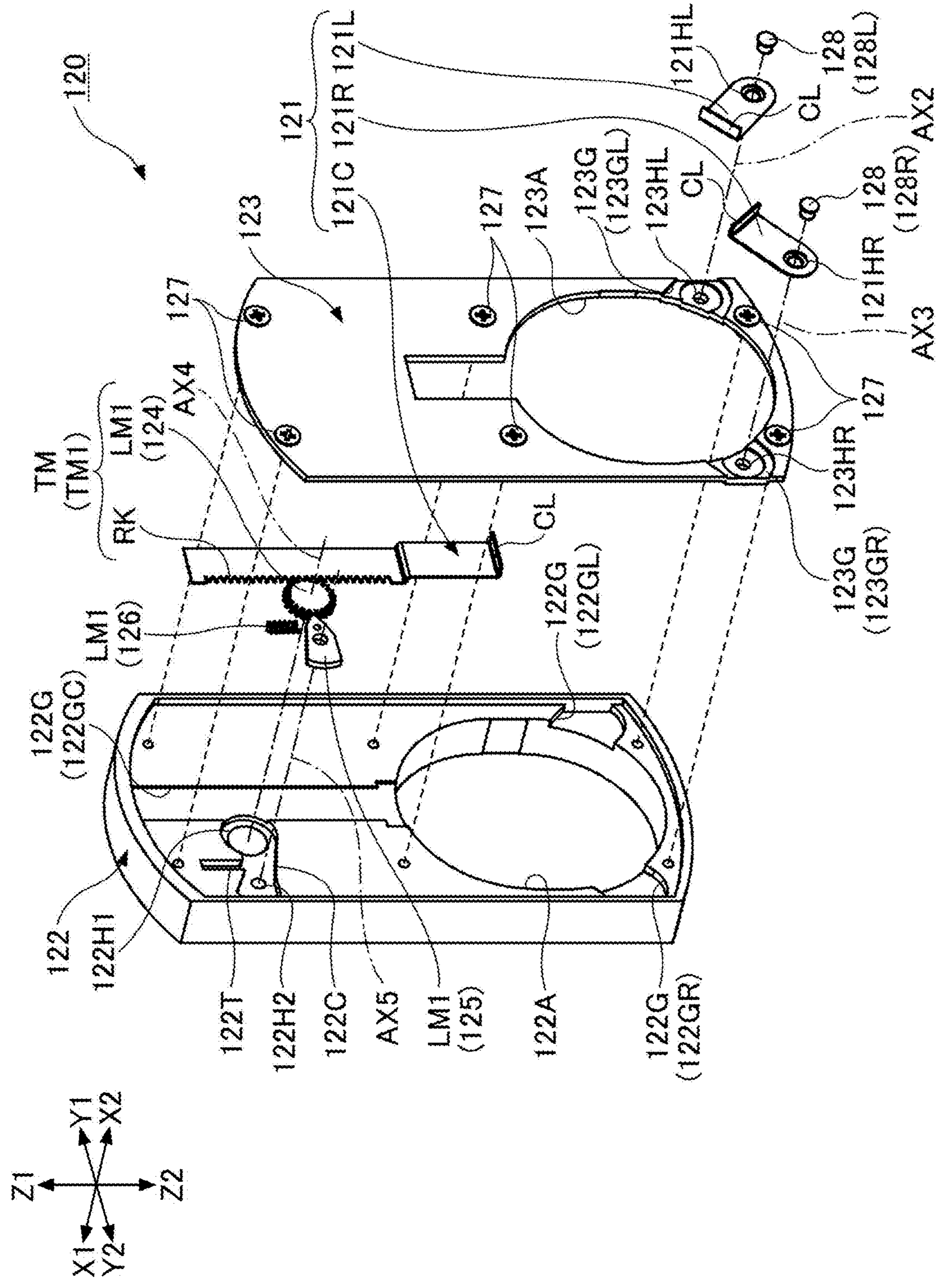
FIG. 4A is an exploded perspective view of a configuration example of the base.
Figure 4B:
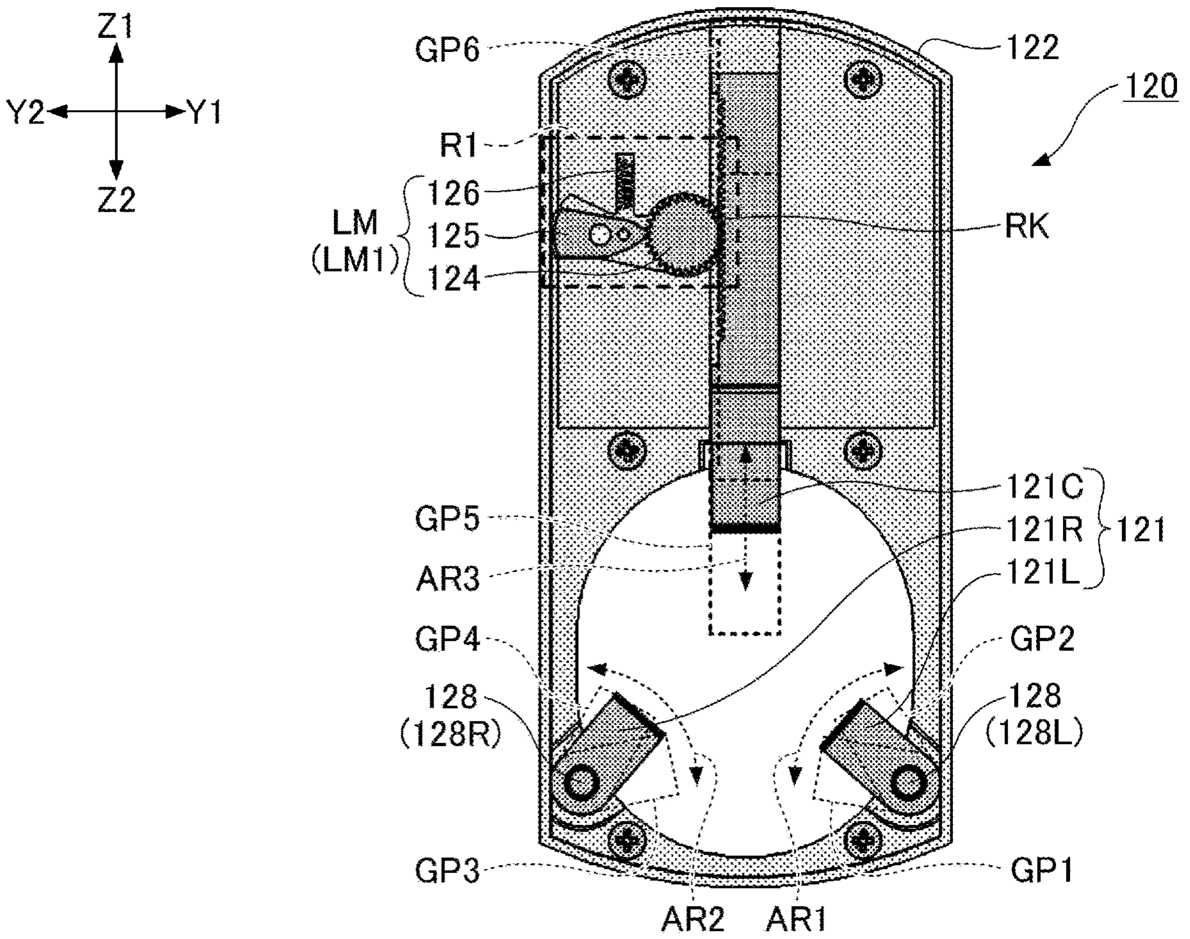
FIG. 4B is a rear view of a configuration example of the base.

A configuration example of the base 120 will be described with reference to FIG. 4A and FIG. 4B. FIG. 4A and FIG. 4B are diagrams illustrating configuration examples of the base 120. Specifically, FIG. 4A is an exploded perspective view of the base 120, and FIG. 4B is a rear view of the base 120.

The base 120 includes an engagement mechanism 121, a body member 122, a base plate 123, a ratchet wheel 124, a ratchet pawl 125, a ratchet spring 126, screws 127, and caulking pins 128.

The engagement mechanism 121 is configured in a manner such that the base 120 can be mounted to the door 20 and the base 120 can be detached from the door 20, without damaging any of the surface 20A on the indoor-side and the surface 20C on the outdoor-side of the door 20. Therefore, in the present embodiment, the engagement mechanism 121 is configured in a manner such that the base 120 can be mounted to the thumb-turn mounting hole TH of the door 20. Specifically, the engagement mechanism 121 is configured to be in contact with at least a part of the inner peripheral surface of the thumb-turn mounting hole TH and to be able to apply a force in a direction of widening the thumb-turn mounting hole TH at at least two locations on the inner peripheral surface of the thumb-turn mounting hole TH. The base 120 is mounted to the thumb-turn mounting hole TH by the engagement mechanism 121 before the thumb-turn device 130 is mounted to the door 20.

In the examples illustrated in FIG. 4A and FIG. 4B, the engagement mechanism 121 is configured to be able to apply a force in the direction of widening the thumb-turn mounting hole TH at three locations on the inner peripheral surface of the thumb-turn mounting hole TH. Specifically, the engagement mechanism 121 includes a central engagement member 121C, a left engagement member 121L, and a right engagement member 121R. The central engagement member 121C, the left engagement member 121L, and the right engagement member 121R are all plate-shaped members formed of metals such as stainless steels. In the examples illustrated in FIG. 4A and FIG. 4B, the engagement mechanism 121 is configured to have three engagement members, but may be configured to have one engagement member, may be configured to have two engagement members, or may be configured to have four or more engagement members.

The body member 122 is a constituent member of the main body of the base 120. In the examples illustrated in FIG. 4A and FIG. 4B, the body member 122 is formed by injection-molding resin. A through-hole 122A for receiving the thumb-turn device 130 is formed in the lower portion of the body member 122. Further, recessed portions 122G for accommodating a part of each of the engagement members are formed on the rear surface (surface on the side in the X2 direction) of the body member 122. Specifically, the recessed portions 122G include a central recessed portion 122GC for accommodating a part of the central engagement member 121C, a left recessed portion 122GL for accommodating a part of the left engagement member 121L, and a right recessed portion 122GR for accommodating a part of the right engagement member 121R. Each of the central engagement member 121C, the left engagement member 121L, and the right engagement member 121R is configured in a manner such that a part thereof protrudes into the through-hole 122A and the remaining part thereof is accommodated in the corresponding recessed portion 122G.

The base plate 123 is a constituent member of the rear surface of the base 120. The base plate 123 is mounted to the rear surface of the body member 122 to cover at least a part of each of the central engagement member 121C, the ratchet wheel 124, the ratchet pawl 125, and the ratchet spring 126. In the examples illustrated in FIG. 4A and FIG. 4B, the base plate 123 is a plate-shaped member formed of a metal such as a highly corrosion-resistant plated steel sheet. A through-hole 123A is formed in the lower portion of the base plate 123 so as to correspond to the through-hole 122A formed in the body member 122.

In the examples illustrated in FIG. 4A and FIG. 4B, the central engagement member 121C is disposed on the front side (the side in the X1 direction) of the base plate 123. That is, the central engagement member 121C is disposed between the rear surface of the body member 122 and the front surface of the base plate 123. On the other hand, the left engagement member 121L and the right engagement member 121R are disposed on the rear side (the side in the X2 direction) of the base plate 123. That is, the left engagement member 1211 and the right engagement member 121R are mounted to the rear surface of the base plate 123. Thus, the base plate 123 has recessed portions 123G for receiving each of the left engagement member 1211 and the right engagement member 121R. The recessed portions 123G are formed by press working to be recessed forward (in the X1 direction). Specifically, the base plate 123 has a left recessed portion 123GL that receives a part of the left engagement member 1211 and a right recessed portion 123GR that receives a part of the right engagement member 121R. The left recessed portion 123GL is accommodated in the left recessed portion 122GL formed in the body member 122 together with a part of the left engagement member 1211, and the right recessed portion 123GR is accommodated in the right recessed portion 122GR formed in the body member 122 together with a part of the right engagement member 121R.

The ratchet wheel 124 is one of the members constituting a moving mechanism TM, and is one of the members constituting a ratchet mechanism LM1. The moving mechanism TM is a mechanism for moving the engagement members in the radial direction of the thumb-turn mounting hole TH. The ratchet mechanism LM1 is an example of a movement restriction mechanism LM for restricting each of the moving directions of the engagement members by the moving mechanism TM to one direction. The ratchet pawl 125 and the ratchet spring 126 are members constituting the ratchet mechanism LM1.

In the examples illustrated in FIG. 4A and FIG. 4B, the ratchet wheel 124, the ratchet pawl 125, and the ratchet spring 126 are all formed of a metal such as stainless steel. The ratchet wheel 124 and the ratchet pawl 125 are accommodated in a recessed portion 122C formed on the rear surface of the body member 122. The ratchet spring 126 is accommodated in a groove 122T formed on the rear surface of the body member 122.

The screws 127 are an example of fixing members for fixing the base plate 123 to the body member 122. The fixing members may be constituted by mechanical elements other than the screws 127. In the examples illustrated in FIG. 4A and FIG. 4B, the base plate 123 is fastened to the rear surface of the body member 122 by six of the screws 127.

The caulking pins 128 are an example of fixing members for fixing the left engagement member 121L and the right engagement member 121R to the base plate 123. The fixing members may be configured by mechanical elements other than the caulking pins 128. In the examples illustrated in FIG. 4A and FIG. 4B, the caulking pins 128 are members formed of metals such as brasses, and include a left caulking pin 128L for fixing the left engagement member 121L to the base plate 123 and a right caulking pin 128R for fixing the right engagement member 121R to the base plate 123.

Specifically, the left engagement member 121L is fixed to the base plate 123 by caulking both ends of the left caulking pin 128L inserted through a left through-hole 123HL formed in the base plate 123 and a left through-hole 121HL formed in the left engagement member 121L. Similarly, the right engagement member 121R is fixed to the base plate 123 by caulking both ends of the right caulking pin 128R inserted into a right through-hole 123HR formed in the base plate 123 and a right through-hole 121HR formed in the right engagement member 121R.

In the examples illustrated in FIG. 4A and FIG. 4B, the left engagement member 121L is mounted so as to be pivotable with respect to the base plate 123 about an axis AX2 of the left caulking pin 128L, and the right engagement member 121R is mounted so as to be pivotable with respect to the base plate 123 about an axis AX3 of the right caulking pin 128R.

In FIG. 4B, a state of the left engagement member 121L when the left engagement member 121L pivots about the axis AX2 and a state of the right engagement member 121R when the right engagement member 121R pivots about the axis AX3 are indicated by dotted lines. Specifically, an arrow AR1 represented by a dotted line represents a pivot direction of the left engagement member 121L, and a figure GP1 and a figure GP2 represented by dotted lines represent positions of the left engagement member 121L after pivot. An arrow AR2 represented by a dotted line represents a pivot direction of the right engagement member 121R, and a figure GP3 and a figure GP4 represented by dotted lines represent positions of the right engagement member 121R after pivot. In FIG. 4B, the base plate 123 is not illustrated for clarity.

In the illustrated example, the left engagement member 121L and the right engagement member 121R are pivotably mounted to the base plate 123, but may be pivotably mounted to the body member 122, or may be pivotably held between the body member 122 and the base plate 123.

Figure 5A:
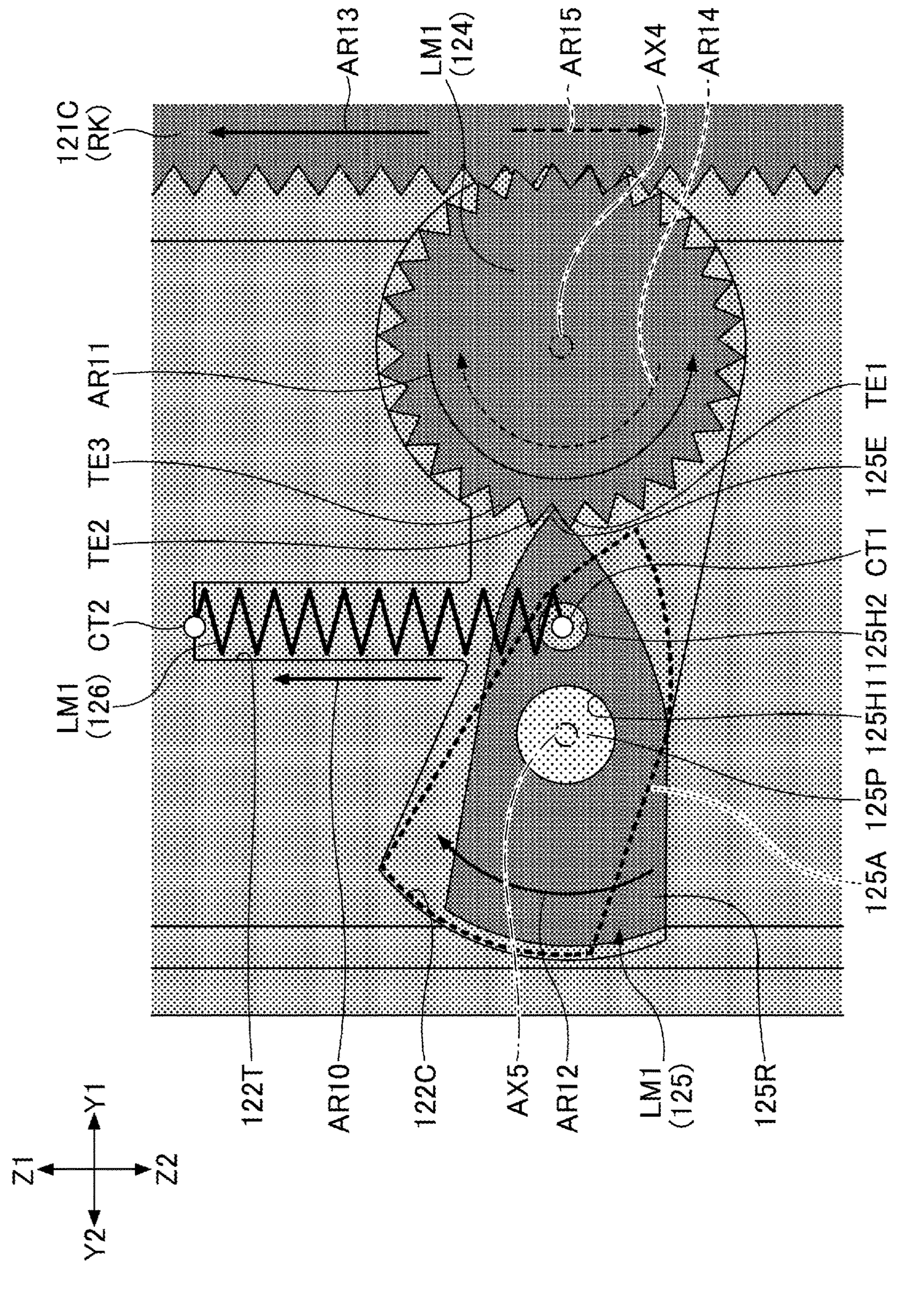
FIG. 5A is a diagram illustrating a configuration example of a ratchet mechanism.
Figure 5B:
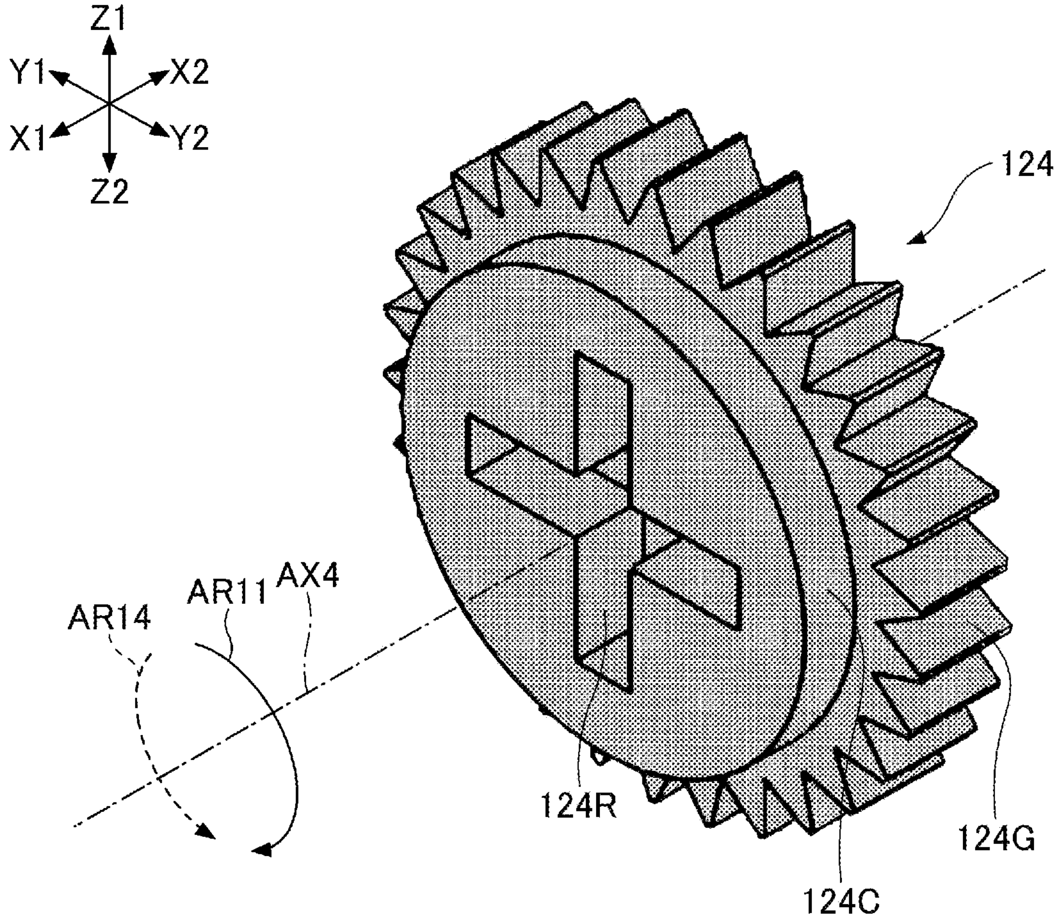
FIG. 5B is a perspective view of a ratchet-wheel.

With reference to FIG. 5A and FIG. 5B, the moving mechanism TM and the ratchet mechanism LM1 will be described. FIG. 5A and FIG. 5B are diagrams illustrating a configuration example of the ratchet mechanism LM1. Specifically, FIG. 5A is an enlarged view of the range surrounded by a broken line R1 in FIG. 4B. FIG. 5B is a perspective view of the ratchet wheel 124. In FIG. 5A, the ratchet spring 126 is illustrated schematically for clarity.

The moving mechanism TM is a mechanism for moving, in the radial directions of the thumb-turn mounting hole TB, the engagement members constituting the engagement mechanism 121 in the base 120 mounted to the thumb-turn mounting hole TH. In the present embodiment, the moving mechanism TM is a rack-and-pinion mechanism TM1 for moving the central engagement member 121C in the vertical direction (Z-axis direction) which is one of the radial directions of the thumb-turn mounting hole TH.

Specifically, the rack-and-pinion mechanism TM1 includes a rack portion RK and the ratchet wheel 124 formed on the central engagement member 121C.

As illustrated in FIG. 5B, the ratchet wheel 124 has a gear portion 124G and a cylindrical portion 124C. The cylindrical portion 124C of the ratchet wheel 124 is fitted into a through-hole 122H1 formed in the body member 122 (see FIG. 4A) so as to be rotatable about an axis AX4 with respect to the body member 122. The gear portion 124G is configured to mesh with the rack portion RK of the central engagement member 121C in the state where the cylindrical portion 124C is fitted into the through-hole 122H1.

Further, a hole 124R corresponding to a tip shape of a tool for rotating the ratchet wheel 124 is formed in a front end face (the side in the X1 direction) of the cylindrical portion 124C. In the examples illustrated in FIG. 5A and FIG. 5B, the hole 124R is a cross hole corresponding to the tip shape of a Phillips screwdriver as an example of a tool for rotating the ratchet wheel 124. Note that the hole 124R may be formed so as to correspond to the tip shape of other tools such as a flat-head screwdriver or a hexagonal wrench. Alternatively, the cylindrical portion 124C may be configured to have a knob on the front end face of the portion so as to be manually operable by a user.

The ratchet mechanism LM1 is an example of the movement restriction mechanism LM for restricting the moving directions of the engagement members by the moving mechanism TM to one direction. In the present embodiment, the ratchet mechanism LM1 is configured to be able to restrict downward movement (in the Z2 direction) of the central engagement member 121C while allowing upward movement (in the Z1 direction) of the central engagement member 121C.

Specifically, the ratchet mechanism LM1 mainly includes the ratchet wheel 124, the ratchet pawl 125, and the ratchet spring 126. The ratchet wheel 124 and the ratchet pawl 125 are accommodated in the recessed portion 122C formed on the rear surface of the body member 122.

The ratchet wheel 124 is accommodated in the recessed portion 122C so as to be rotatable about the axis AX4.

As illustrated in FIG. 5A, the ratchet pawl 125 is configured to be rotatable about an axis AX5 of a pin 125P in the recessed portion 122C. The pin 125P is configured to be inserted into a through-hole 125H1 formed in a central portion of the ratchet pawl 125 and inserted into a through-hole 122H2 (see FIG. 4A) formed in the body member 122. In this embodiment, the ratchet pawl 125 is fixed to the pin 125P and is configured to turn with the pin 125P about the axis AX5. The ratchet pawl 125 and the pin 125P may be coupled by, for example, tight fit. Also, the front end of the pin 125P may be configured to protrude forward from the front surface of the body member 122 so that the user can manually rotate the pin. Alternatively, a hole corresponding to the tip shape of a tool for rotating the pin 125P may be formed in the front end face of the pin 125P.

A FIG. 125A represented by a dotted line in FIG. 5A illustrates the ratchet pawl 125 turning about the axis AX5 when the ratchet wheel 124 rotates in a direction indicated by an arrow AR11. The FIG. 125A also indicates that the engagement between a tip portion 125E of the ratchet pawl 125 and the ratchet wheel 124 is released when the ratchet wheel 124 rotates in the direction indicated by the arrow AR11.

As illustrated in FIG. 5A, the ratchet spring 126 is accommodated in the groove 122T formed on the rear surface of the body member 122. A lower end CT1 of the ratchet spring 126 is fixed to a through-hole 125H2 formed in the ratchet pawl 125, and an upper end CT2 of the ratchet spring 126 is fixed to the upper end portion of the groove 122T. The through-hole 125H2 is formed between the through-hole 125H1 and the tip portion 125E.

With this configuration, the ratchet spring 126 generates a force that pulls the tip portion 125E of the ratchet pawl 125 upward (in the Z1 direction) as indicated by an arrow AR10 in FIG. 5A. The ratchet spring 126 then generates a torque for rotating the ratchet pawl 125 counterclockwise about the axis AX5 of the pin 125P when viewed from the back as illustrated in FIG. 5A.

When the operator rotates the ratchet wheel 124 in the direction indicated by the arrow AR11 in FIG. 5A and FIG. 5B using the Phillips screwdriver, the tip portion 125E of the ratchet pawl 125 is pushed by a second tooth TE2 of the ratchet wheel 124, and rotates in the direction indicated by an arrow AR12 in FIG. 5A.

At this time, when the engagement between the second tooth TE2 of the ratchet wheel 124 and the tip portion 125E of the ratchet pawl 125 is released, the tip portion 125E of the ratchet pawl 125 is pulled upward by the ratchet spring 126 and engages with a third tooth TE3 of the ratchet wheel 124. When the operator further rotates the ratchet wheel 124 in the direction indicated by the arrow AR11, the tip portion 125E of the ratchet pawl 125 is pushed by the third tooth TE3 of the ratchet wheel 124 and further rotates in the direction indicated by the arrow AR11. The subsequent movement of the ratchet wheel 124 and the ratchet pawl 125 is the same as the movement described above.

When the ratchet wheel 124 rotates in the direction indicated by the arrow AR11, the central engagement member 121C moves upward (in the Z1 direction) as indicated by an arrow AR13.

However, the operator cannot rotate the ratchet wheel 124, when the operator rotates the ratchet wheel 124 in the direction indicated by an arrow AR14 in FIG. 5A and FIG. 5B using the Phillips screwdriver. Specifically, the operator cannot rotate the ratchet wheel 124 in the direction indicated by the arrow AR14 unless the engagement between the tip portion 125E of the ratchet pawl 125 and a first tooth TE1 of the ratchet wheel 124 by the ratchet mechanism LM1 is released.

When the operator rotates the ratchet wheel 124 in the direction indicated by the arrow AR14 using the Phillips screwdriver, the tip portion 125E of the ratchet pawl 125 is pushed by the first tooth TE1 of the ratchet wheel 124. However, since a rear end portion 125R is already pressed against the surface of the recessed portion 122C, the ratchet pawl 125 cannot rotate clockwise when viewed from the back. Thus, the central engagement member 121C cannot move downward (in the Z2 direction) which is the direction indicated by an arrow AR15.

In this way, the ratchet mechanism LM1 is configured to allow counterclockwise rotation of the ratchet wheel 124 about the axis AX4 and restrict clockwise rotation of the ratchet wheel 124 about the axis AX4, when viewed from the back as illustrated in FIG. 5A. That is, the ratchet mechanism LM1 is configured to allow upward movement of the central engagement member 121C and restrict downward movement of the central engagement member 121C.

When the operator wants to move the central engagement member 121C downward, that is, when the operator wants to rotate the ratchet wheel 124 clockwise about the axis AX4, the engagement between the tip portion 125E of the ratchet pawl 125 and the first tooth TE1 of the ratchet wheel 124 by the ratchet mechanism LM1 is required to be released.

Specifically, the operator can obtain the state in which the engagement between the tip portion 125E and the first tooth TE1 is released by manually rotating the pin 125P configured to rotate together with the ratchet pawl 125 to rotate the ratchet pawl 125 in the direction indicated by the arrow AR12. Then, in the state where the engagement between the tip portion 125E and the first tooth TE1 is released, the operator rotates the ratchet wheel 124 in the direction indicated by the arrow AR14 using the Phillips screwdriver, thereby moving the central engagement member 121C downward as indicated by the arrow AR15.

An arrow AR3 represented by a dotted line in FIG. 4B represents a moving direction of the central engagement member 121C, a figure GP5 represented by a dotted line represents a position of the central engagement member 121C after being moved in the Z2 direction (downward), and a figure GP6 represented by a dotted line represents a position of the central engagement member 121C after being moved in the Z1 direction (upward). The operator can move the central engagement member 121C in the vertical direction by rotating the ratchet wheel 124 as described above.

Figure 6A:
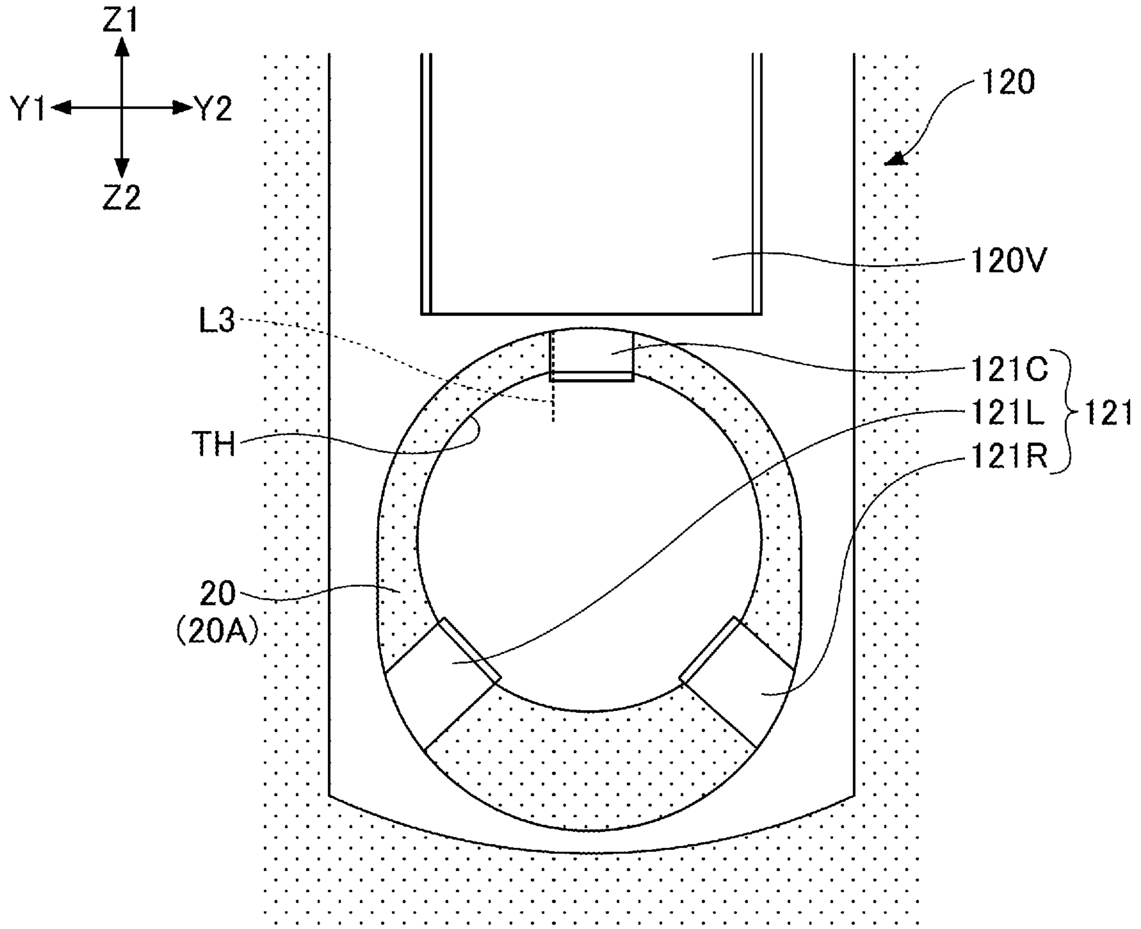
FIG. 6A is a front view of an engagement mechanism in the base fixed to a thumb-turn mounting hole.
Figure 6B:
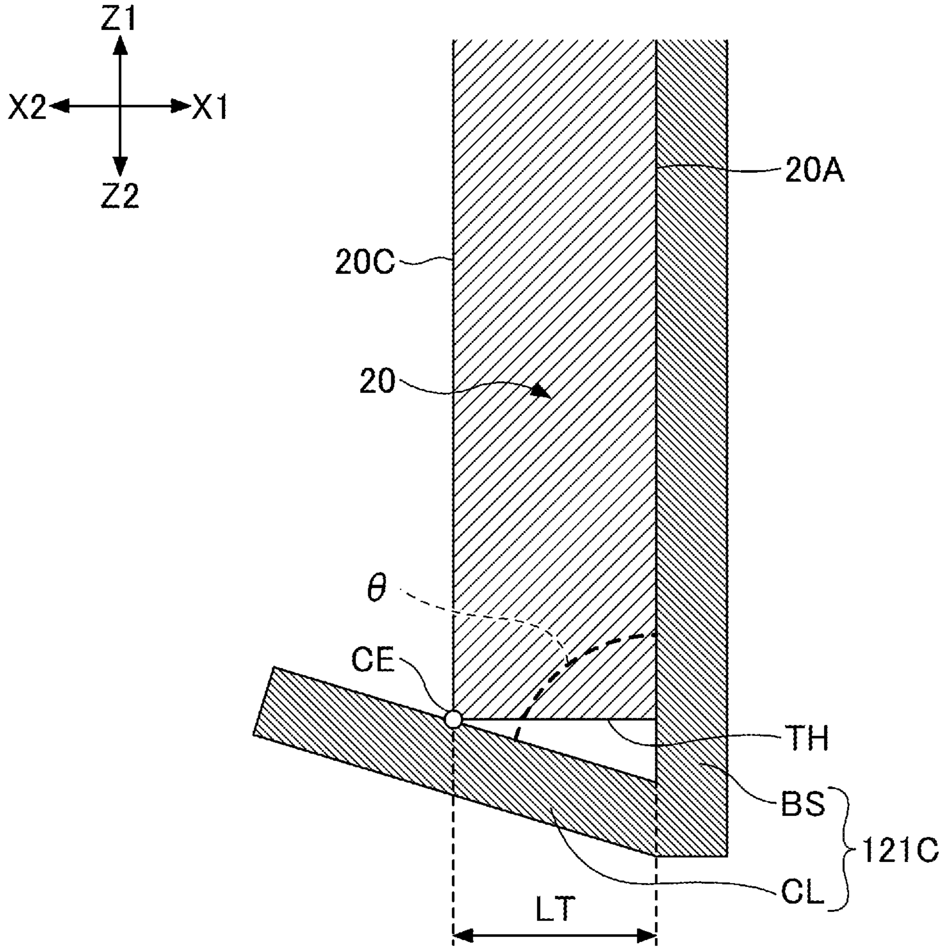
FIG. 6B is a cross-sectional view of a central engagement member and a door.

The engagement mechanism 121 will be described with reference to FIG. 6A and FIG. 6B. FIG. 6A and FIG. 6B are diagrams illustrating the engagement mechanism 121 mounted to the base 120 fixed to the thumb-turn mounting hole TH. Specifically, FIG. 6A is a front view of the engagement mechanism 121 mounted to the base 120 fixed to the thumb-turn mounting hole TH. FIG. 6B is a cross-sectional view of the central engagement member 121C and the door 20 in a plane parallel to the XZ plane including a dashed-and-dotted line L3 of FIG. 6A. Note that the following description relates to the central engagement member 121C, and the same applies to each of the left engagement member 1211 and the right engagement member 121R.

As illustrated in FIG. 6B, the central engagement member 121C, which is the plate-shaped member formed of a metal such as stainless steel, has a base portion BS and a claw portion CL. In the examples illustrated in FIG. 6A and FIG. 6B, the claw portion CL is a portion formed by bending, and is configured in a manner such that an angle 9 formed between the base portion BS and the claw portion CL is an acute angle less than 90 degrees.

With this configuration, the central engagement member 121C is disposed such that the rear face (the surface on the side in the X2 direction) of the base portion BS is in contact with the surface 20A on the indoor-side of the door 20 and the upper surface (the surface on the side in the Z1 direction) of the claw portion CL is in contact with an edge CE on the rear side (in the X2 direction) of the inner peripheral surface of the thumb-turn mounting hole TH. Thus, even when a force to pull out the base 120 forward (in the X1 direction) acts on the base 120, the claw portion CL is caught by the edge CE on the rear side (in the X2 direction) of the inner peripheral surface of the thumb-turn mounting hole TH, and the base 120 is not separated from the door 20.

Further, in this configuration, regardless of a length LT of the thumb-turn mounting hole TH, the upper surface of the claw portion CL can be brought into contact with the edge CE on the rear side of the inner peripheral surface of the thumb-turn mounting hole TH. Therefore, this configuration brings about an effect that the engagement mechanism 121 can be applied to the thumb-turn mounting holes TH having various lengths LT. However, the angle 9 formed between the base portion BS and the claw portion CL is not limited to an acute angle and may be more than or equal to 90 degrees. Furthermore, the claw portion CL may be formed so as to be bent more than or equal to two times, or may be formed so as to extend in a curved manner.

Figure 7A:
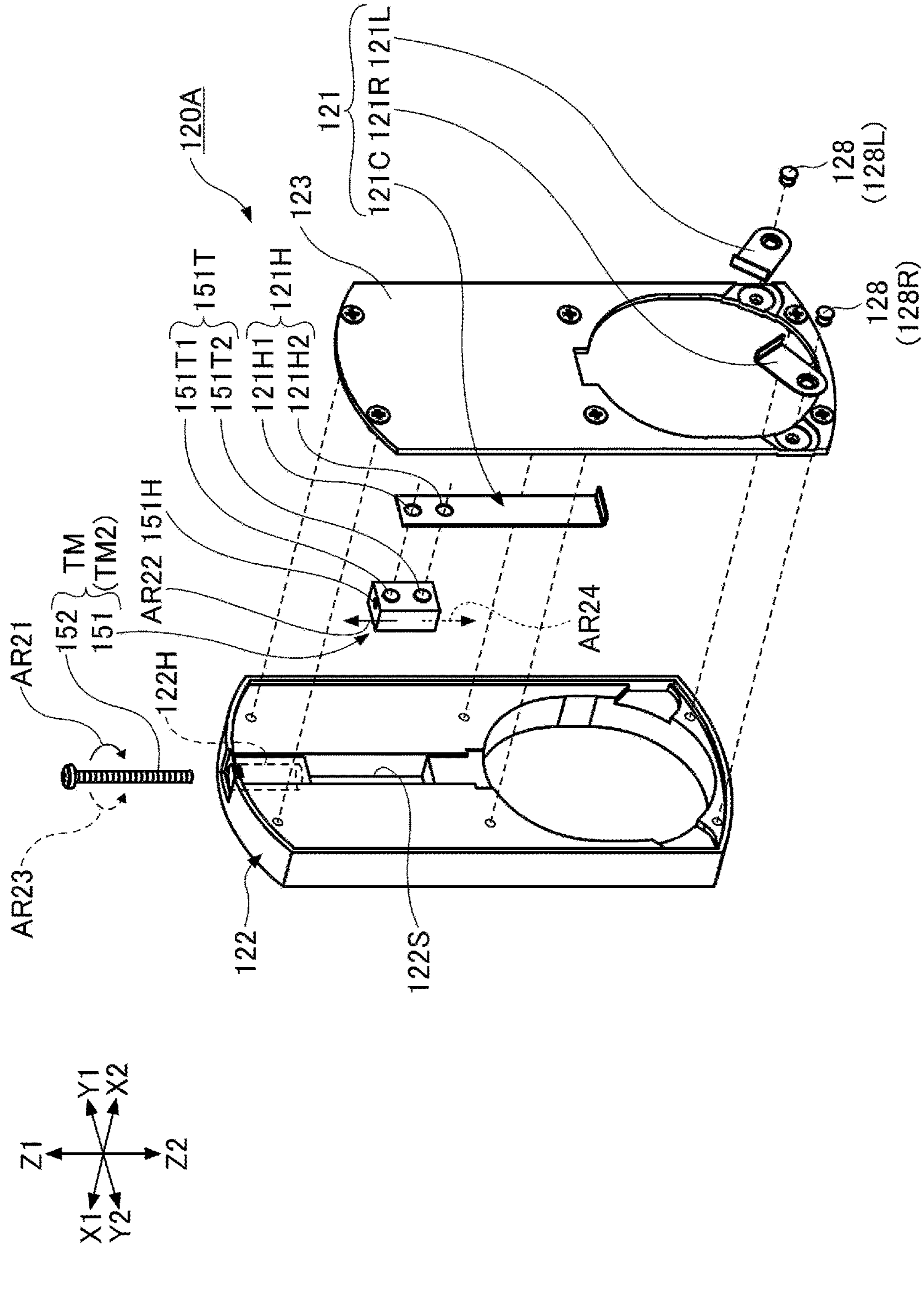
FIG. 7A is an exploded perspective view of another configuration example of the base.
Figure 7B:
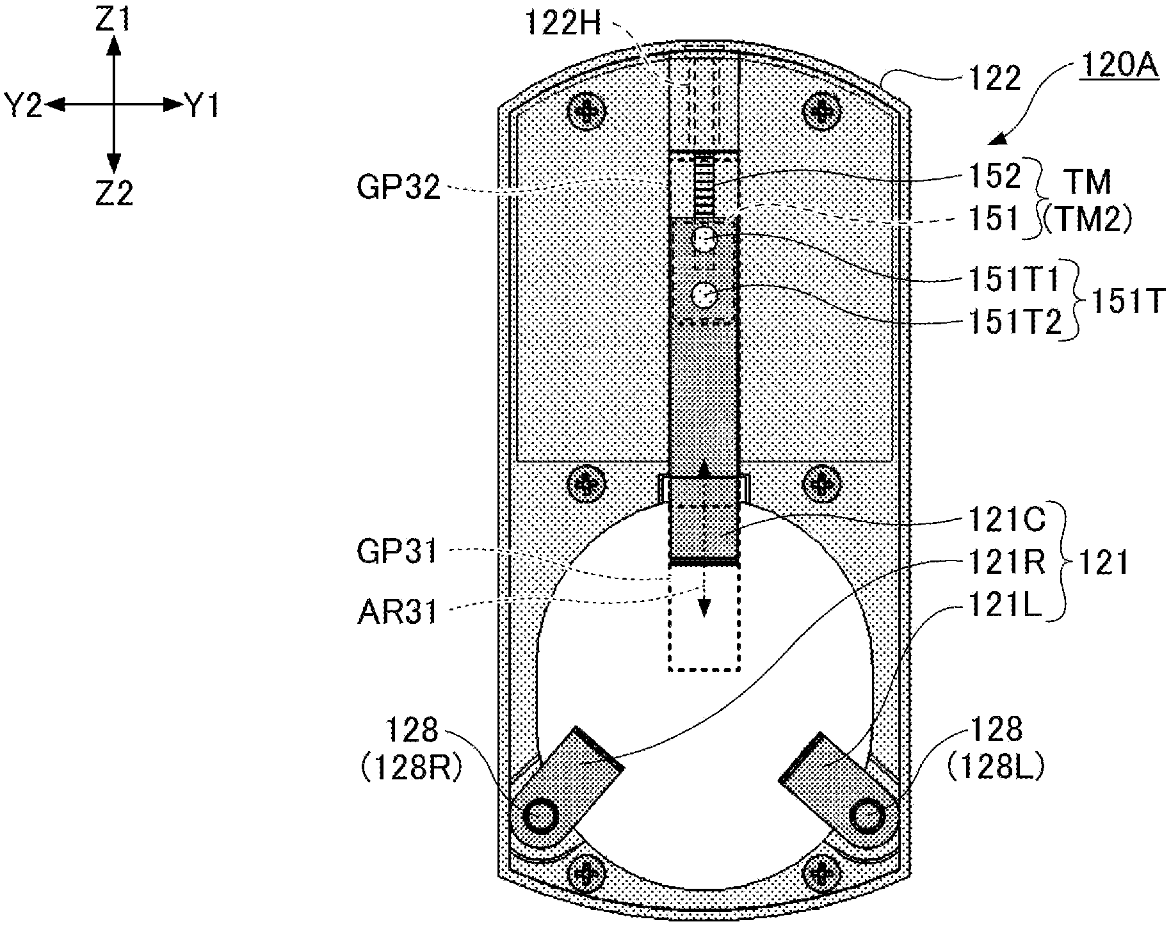
FIG. 7B is a rear view of another configuration example of the base.

Another configuration example of the base 120 will be described with reference to FIG. 7A and FIG. 7B. FIG. 7A and FIG. 7B are diagrams illustrating a base 120A which is another configuration example of the base 120. Specifically, FIG. 7A is an exploded perspective view of the base 120A and corresponds to FIG. 4A. FIG. 7B is a rear view of the base 120A and corresponds to FIG. 4B.

The base 120A illustrated in FIG. 7A and FIG. 7B is different from the base 120 illustrated in FIG. 4A and FIG. 4B in that a lead screw mechanism TM2 is provided as the moving mechanism TM. The base 120 illustrated in FIG. 4A and FIG. 4B includes the rack-and-pinion mechanism TM1 as the moving mechanism TM. The base 120A illustrated in FIG. 7A and FIG. 7B is different from the base 120 illustrated in FIG. 4A and FIG. 4B in that the movement restriction mechanism LM is omitted. The base 120 illustrated in FIG. 4A and FIG. 4B has the ratchet mechanism LM1 as the movement restriction mechanism LM. Other aspects are common to both the base 120A illustrated in FIG. 7A and FIG. 7B and the base 120 illustrated in FIG. 4A and FIG. 4B. Therefore, in the following description, the common portions between the base 120A and the base 120 will not be described, and the different portions therebetween will be described in detail.

The lead screw mechanism TM2 as the moving mechanism TM is mainly constituted by a slider 151 and a screw 152.

The slider 151 is configured to be supported by the body member 122 so as to be slidable in the vertical direction (Z-axis direction) and not rotatable about the vertical axis (Z-axis). The slider 151 may be made of metal, or may be made of resin. In the examples illustrated in FIG. 7A and FIG. 7B, the slider 151 has a substantially rectangular parallelepiped shape and is accommodated in a rectangular groove 122S formed on the rear surface (the surface on the side in the X2 direction) of the body member 122. The rectangular groove 122S is formed such that the slider 151 is slidable in the vertical direction and is not rotatable about the vertical axis (Z-axis). Specifically, the rectangular groove 122S is configured such that the length thereof in the vertical direction is significantly larger than the length of the slider 151 in the vertical direction. Further, the rectangular groove 122S is configured such that the length (width) thereof in the left-right direction is substantially the same as the length (width) of the slider 151 in the left-right direction (strictly, such that the width of the rectangular groove 122S is slightly larger than the width of the slider 151).

The slider 151 is configured to be fixed to the upper end portion of the central engagement member 121C. In the examples illustrated in FIG. 7A and FIG. 7B, the slider 151 includes two protruding portions 151T (an upper protruding portion 151T1 and a lower protruding portion 151T2) protruding rearward from the rear surface thereof. Two protruding portions 151T are configured to be inserted into two through-holes 121H (an upper through-hole 121H1 and a lower through-hole 121H2) formed in the upper end portion of the central engagement member 121C, respectively.

The slider 151 is fixed to the central engagement member 121C by caulking each end of the two protruding portions 151T inserted into the two through-holes 121H formed in the upper end portion of the central engagement member 121C. The slider 151 may be fixed to the central engagement member 121C by other means such as an adhesive or a screw.

The screw 152 is configured to engage with the slider 151. In the examples illustrated in FIG. 7A and FIG. 7B, the screw 152 is configured to engage with a female screw hole 151H formed in the slider 151. Specifically, the screw 152 is configured to be inserted into the through-hole 122H formed in the body member 122 so that the screw tip extends inside the rectangular groove 122S. The screw 152 is then screwed into the female screw hole 151H of the slider 151 accommodated in the rectangular groove 122S.

In the examples illustrated in FIG. 7A and FIG. 7B, the screw 152 is a metric screw in which a cross hole is formed in the screw head. The operator can slide the slider 151 in the vertical direction within the rectangular groove 122S by rotating the screw 152 screwed into the female screw hole 151H of the slider 151 with the Phillips screwdriver. This is achieved since the rotation of the slider 151 about the vertical axis (Z-axis) is restricted by being accommodated in the rectangular groove 122S.

Specifically, the operator can slide the slider 151 in the direction indicated by an arrow AR22 (the Z1 direction) by rotating the screw 152 in the direction indicated by an arrow AR21 (the clockwise direction in top view). Conversely, the operator can slide the slider 151 in the direction indicated by an arrow AR24 (the Z2 direction) by rotating the screw 152 in the direction indicated by an arrow AR23 (the counterclockwise direction in top view).

An arrow AR31 represented by a dotted line in FIG. 7B represents a moving direction of the central engagement member 121C, a figure GP31 represented by a dotted line represents a position of the central engagement member 121C after being moved in the Z2 direction (downward), and a figure GP32 represented by a dotted line represents a position of the central engagement member 121C after being moved in the Z1 direction (upward). The operator can move the central engagement member 121C in the vertical direction by rotating the screw 152 as described above. In FIG. 7B, the base plate 123 is not illustrated for clarity.

According to the above-described configuration, the base 120A illustrated in FIG. 7A and FIG. 7B provides the same effect as the base 120 illustrated in FIG. 4A and FIG. 4B. Specifically, the base 120A constituting the electronic lock mounting structure FS brings about a unique effect that the electronic lock 100 can be removed from the door 20 without damaging the surface 20A on the indoor-side of the door 20. This is achieved since a strong double-sided tape is not required to be placed between the surface 20A on the indoor-side of the door 20 and the base 120A.

Furthermore, the base 120A illustrated in FIG. 7A and FIG. 7B brings about an additional effect that the number of components can be reduced as compared with the base 120 illustrated in FIG. 4A and FIG. 4B. The base 120A also brings about another additional effect that the movement of the central engagement member 121C in the vertical direction can be facilitated as compared with the base 120 having the ratchet mechanism LM1 as the movement restriction mechanism LM. This is achieved since, when the base 120A is adopted, the operator can omit an operation of manually operating the ratchet pawl 125 in order to release the movement restriction by the ratchet mechanism LM1, and can slide the slider 151 (central engagement member 121C) in the vertical direction only by rotating the screw 152 in one direction or the other direction.

As described above, the electronic lock mounting structure FS according to the embodiment of the present invention is configured to be disposed between the electronic lock 100 and the door 20 in order to mount the electronic lock 100 on the door as illustrated in FIG. 1A to FIG. 1C. Further, as illustrated in FIG. 2, the electronic lock mounting structure FS includes the engagement mechanism 121 configured to engage with the thumb-turn mounting hole TH provided in the door 20.

With this configuration, the electronic lock mounting structure FS brings about a unique effect that the electronic lock 100 can be removed from the door 20 without damaging the surface 20A on the indoor-side of the door 20. This is achieved since a strong double-sided tape is not required to be placed between the surface 20A on the indoor-side of the door 20 and the electronic lock mounting structure FS.

The engagement mechanism 121 may include a plurality of claw portions CL formed to engage with the thumb-turn mounting hole TH, and the moving mechanism TM configured to be able to move at least one of the plurality of claw portions in the radial direction of the thumb-turn mounting hole TH.

Specifically, as illustrated in FIG. 4A and FIG. 6B, the engagement mechanism 121 may include three claw portions CL (the claw portion CL of the central engagement member 121C, the claw portion CL of the left engagement member 121L, and the claw portion CL of the right engagement member 121R) and the moving mechanism TM configured to be able to move the claw portion CL of the central engagement member 121C in the Z-axis direction which is one of the radial directions of the thumb-turn mounting hole TH.

More specifically, the moving mechanism TM may be the rack-and-pinion mechanism TM1 as illustrated in FIG. 4A. In this case, the engagement mechanism 121 may include the ratchet mechanism LM1 (see FIG. 4B) that restricts the direction in which the claw portion CL of the central engagement member 121C is moved by the rack-and-pinion mechanism TM1. Alternatively, the moving mechanism TM may be the lead screw mechanism TM2 as illustrated in FIG. 7A and FIG. 7B.

These configurations bring about an effect that the mounting strength of the electronic lock unit (the base 120) to the door 20 can be increased as compared with a case where the electronic lock unit 10 is mounted to the door 20 by a double-sided tape. Furthermore, these configurations bring about another effect that the base 120 can be mounted to the thumb-turn mounting hole TH having various diameters.

Furthermore, in order to bring about the same effect, the claw portion CL of the left engagement member 121L and the claw portion CL of the right engagement member 121R may be mounted to the base 120 in a pivotable manner as illustrated in FIG. 4B.

The three claw portions CL may be arranged at substantially equal intervals in the circumferential direction of the thumb-turn mounting hole TH. Specifically, as illustrated in FIG. 6A, the claw portion CL of the central engagement member 121C, the claw portion CL of the left engagement member 121L, and the claw portion CL of the right engagement member 121R may be arranged at intervals of approximately 120 degrees in the circumferential direction of the substantially circular thumb-turn mounting hole TH. As described above, by arranging the points (three contact points) at which the thumb-turn mounting hole TH and the engagement mechanism 121 come into contact with each other around the center point of the thumb-turn mounting hole TH in a well-balanced manner, the mounting strength of the electronic lock unit 10 (base 120) to the door is increased. Therefore, in a case where the engagement mechanism 121 includes two claw portions, the two claw portions are arranged at an interval of approximately 180 degrees in the circumferential direction of the thumb-turn mounting hole TH. In a case where the engagement mechanism 121 includes four claw portions, the four claw portions are desirably arranged at intervals of approximately 90 degrees in the circumferential direction of the thumb-turn mounting hole TH.

At least one of the plurality of claw portions CL may be configured to engage with the edge on the rear side of the inner peripheral surface of the thumb-turn mounting hole TH. For example, as illustrated in FIG. 6B, each of the three claw portions CL (the claw portion CL of the central engagement member 121C, the claw portion CL of the left engagement member 121L, and the claw portion CL of the right engagement member 121R) may be bent with respect to the base portion BS such that the angle θ formed between the claw portion CL and the base portion BS is an acute angle, and may be configured to come into contact with the edge CE on the rear side of the inner peripheral surface of the thumb-turn mounting hole TH.

This configuration brings about an effect that the mounting strength of the electronic lock unit 10 (the base 120) to the door 20 can be increased compared to a case where each claw portion CL is configured to be bent perpendicularly to the base portion BS and configured to come into contact with the inner peripheral surface of the thumb-turn mounting hole TH.

Figure 8:
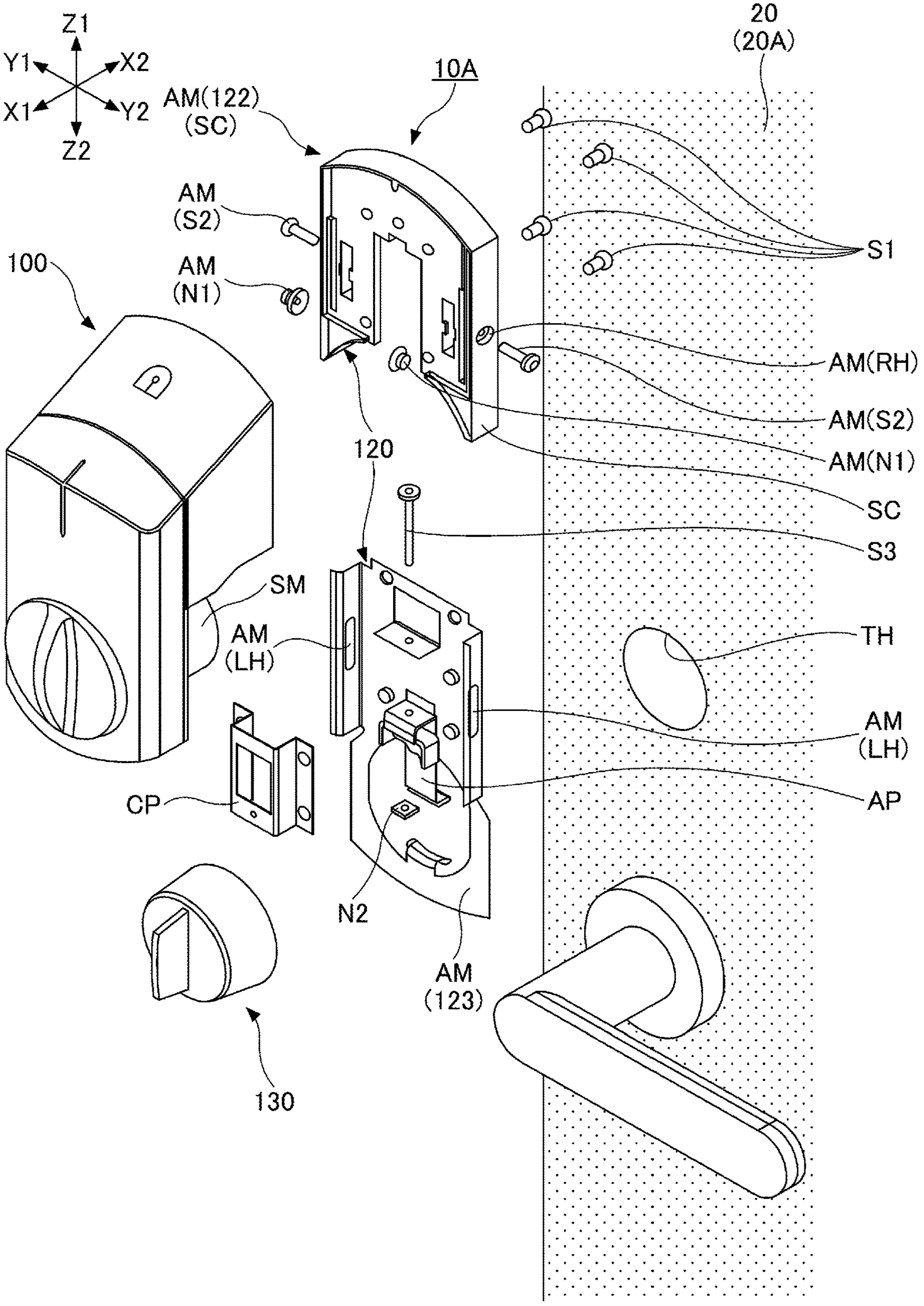
FIG. 8 is a front perspective view of another configuration example of the electronic lock unit.
Figure 9:
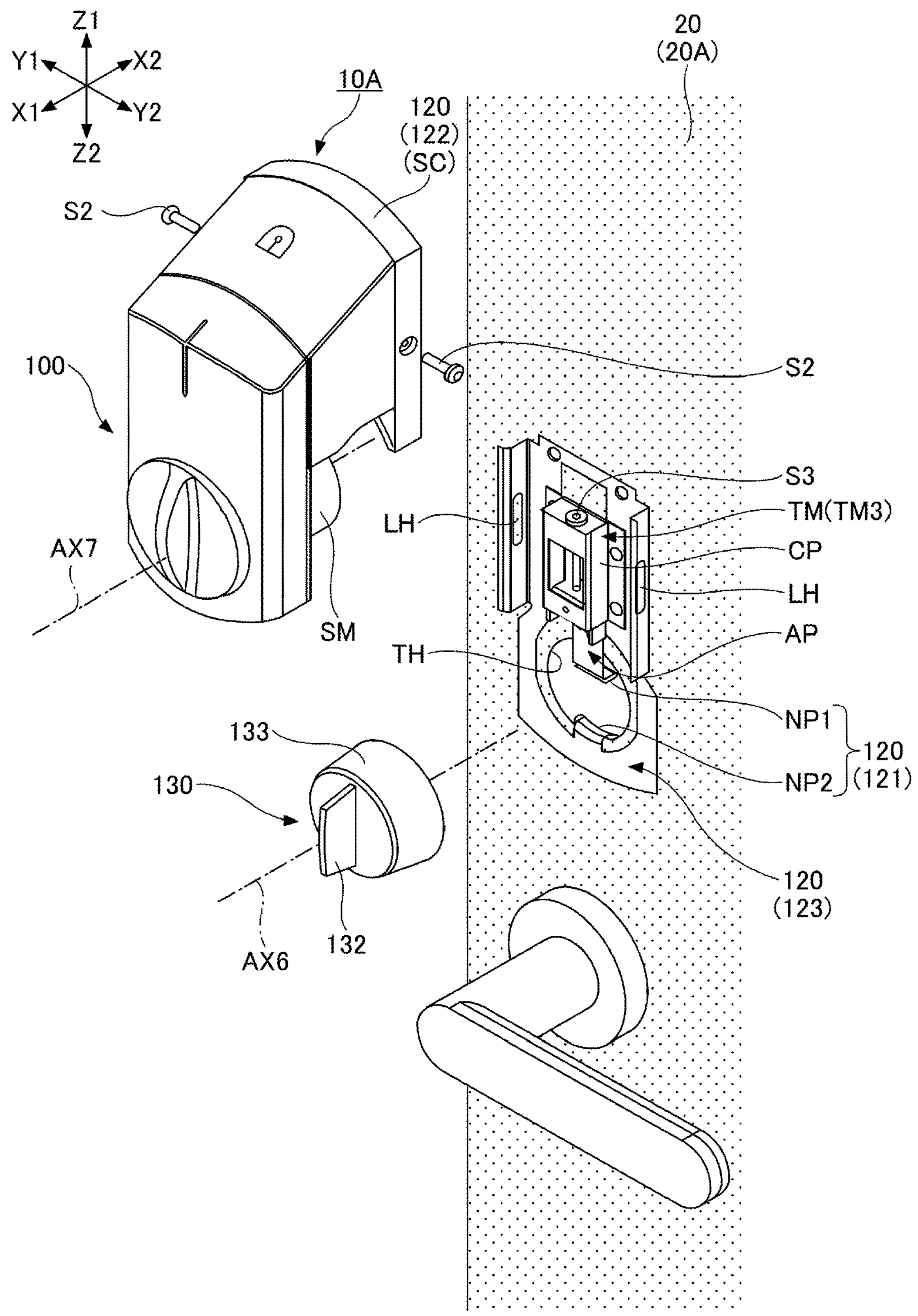
FIG. 9 is a front perspective view of another configuration example of the electronic lock unit.
Figure 10:
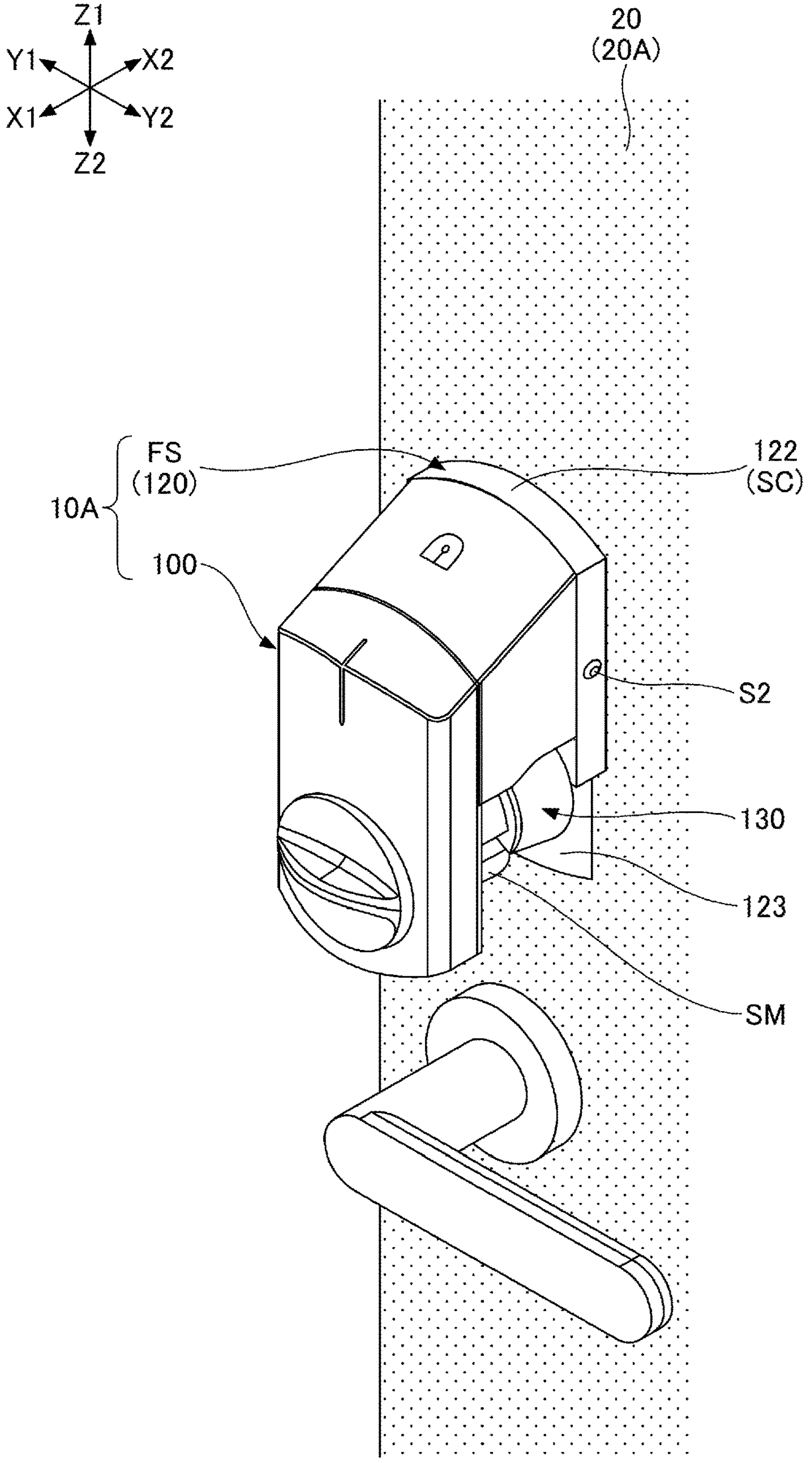
FIG. 10 is a front perspective view of another configuration example of the electronic lock unit.

An electronic lock unit 10A which is another configuration example of the electronic lock unit will be described with reference to FIG. 8 to FIG. 10. FIG. 8 to FIG. 10 are front perspective views of the electronic lock unit 10A. As illustrated in FIG. 10, the electronic lock unit 10A includes an electronic lock 100 and a base 120. In the examples illustrated in FIG. 8 to FIG. 10, an attachment 110 of FIG. 2 in the above-described embodiment is omitted. An electronic lock mounting structure FS for mounting an electronic lock 100 to a door 20 is configured by the base 120.

Specifically, as illustrated in FIG. 9, the base 120 includes an engagement mechanism 121, a slide cover SC as a body member 122, and a base plate 123. The engagement mechanism 121 includes a claw portion NP1 of an adjustment plate AP and a claw portion NP2 of the base plate 123 as engagement members.

As illustrated in FIG. 9, the adjustment plate AP is one of the members constituting a moving mechanism TM for moving the claw portion NP1 as the engagement member mounted to the thumb-turn mounting hole TH in the radial direction of the thumb-turn mounting hole TH. Details of the moving mechanism TM will be described later. The adjustment plate AP is one of the members constituting a mounting unit for mounting the base 120 to the door 20.

As illustrated in FIG. 8 to FIG. 10, the electronic lock unit 10A is mounted to the door 20. Hereinafter, a procedure to mount the electronic lock unit 10A on the door by an operator will be described.

Specifically, as illustrated in FIG. 8, an operator firstly removes a thumb-turn device 130 from the door 20 to expose the thumb-turn mounting hole TH formed in a surface 20A on the indoor-side of the door 20.

As illustrated in FIG. 9, the operator then inserts the claw portion NP1 of the adjustment plate AP and the claw portion NP2 of the base plate 123 into the thumb-turn mounting hole TH.

The operator then tightens a screw S3, which is a component of the moving mechanism TM, to press the claw portion NP1 and the claw portion NP2 against the inner peripheral surface of the thumb-turn mounting hole TH, thereby fixing the adjustment plate AP and the base plate 123 to the door 20. Then, the operator mounts the thumb-turn device 130 to the door 20. That is, the operator remounts the thumb-turn device 130 to the thumb-turn mounting hole TH to which the adjustment plate AP and the base plate 123 are fixed.

As illustrated in FIG. 8, the operator then fixes the slide cover SC to the main body of the electronic lock 100 with four screws S1. A spacer for adjusting the distance between a holding mechanism SM and the thumb-turn device 130 in the X-axis direction may be disposed between the slide cover SC and the main body of the electronic lock 100. Then, the operator mounts the slide cover SC fixed to the main body of the electronic lock 100 to the base plate 123. The slide cover SC is slidably fitted to the base plate 123.

As illustrated in FIG. 9, the operator then visually aligns a rotation center axis AX6 of the thumb-turn device 130 and a rotation axis AX7 of the holding mechanism SM (driving unit) of the electronic lock 100, and fixes the slide cover SC to the base plate 123 by tightening screws S2. At this time, since fixing holes LH of the base plate 123 through which the respective screws S2 are inserted are long holes extending in the vertical direction (Z-axis direction), the fixing position of the slide cover SC can be adjusted in the vertical direction (Z-axis direction). That is, the fixing position of the slide cover SC can be adjusted in the vertical direction (Z-axis direction) by an adjustment mechanism AM configured to include the screws S2 and the fixing holes LH. Details of the adjustment mechanism AM will be described later. The operator therefore can move the electronic lock 100 in the vertical direction (Z-axis direction) with respect to the thumb-turn device 130 in a state in which the slide cover SC is slidably engaged with the base plate 123, and can arrange the rotation axis AX7 of the holding mechanism SM (driving unit) of the electronic lock 100 at an appropriate position. That is, the operator can make the rotation center axis AX6 of the thumb-turn device 130 coincide with the rotation axis AX7 of the holding mechanism SM (driving unit). FIG. 10 illustrates a state of the electronic lock unit 10A when the rotation center axis AX6 of the thumb-turn device 130 and the rotation axis AX7 of the holding mechanism SM (driving unit) coincide with each other.

Figure 11A:
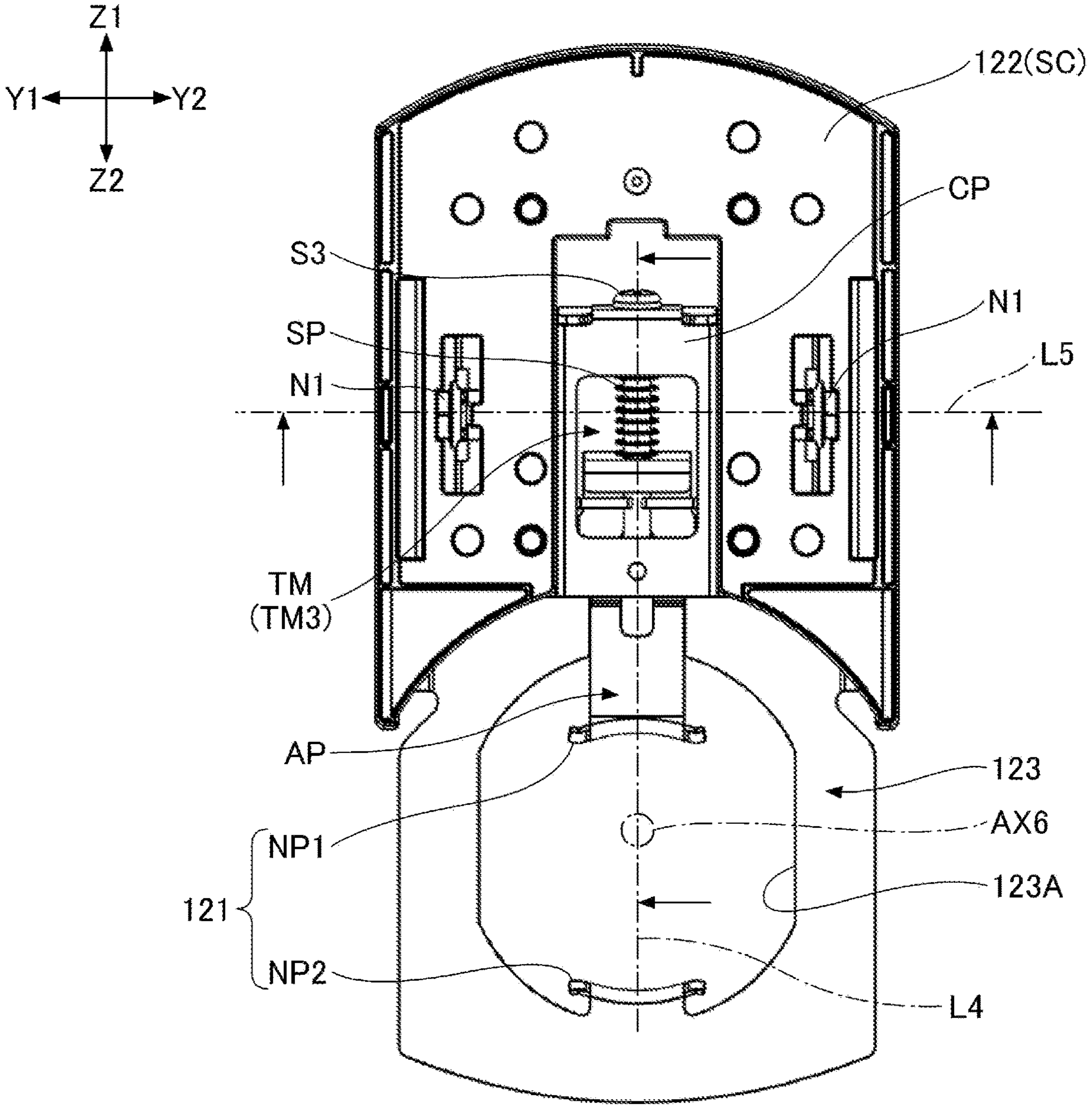
FIG. 11A is a top view of an adjustment plate, a base plate, a cover plate, and a sliding cover.
Figure 11B:
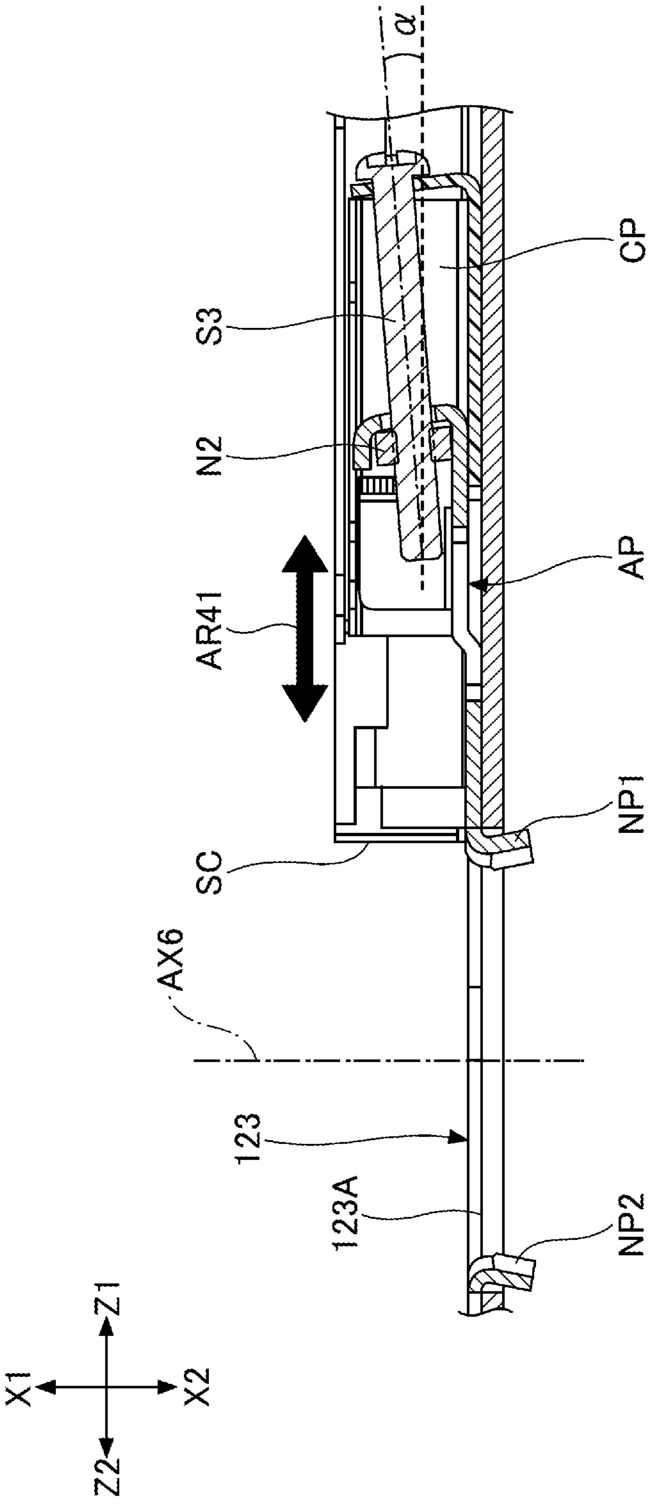
FIG. 11B is a cross-sectional view of the adjustment plate, the base plate, the cover plate, and the sliding cover.
Figure 12A:
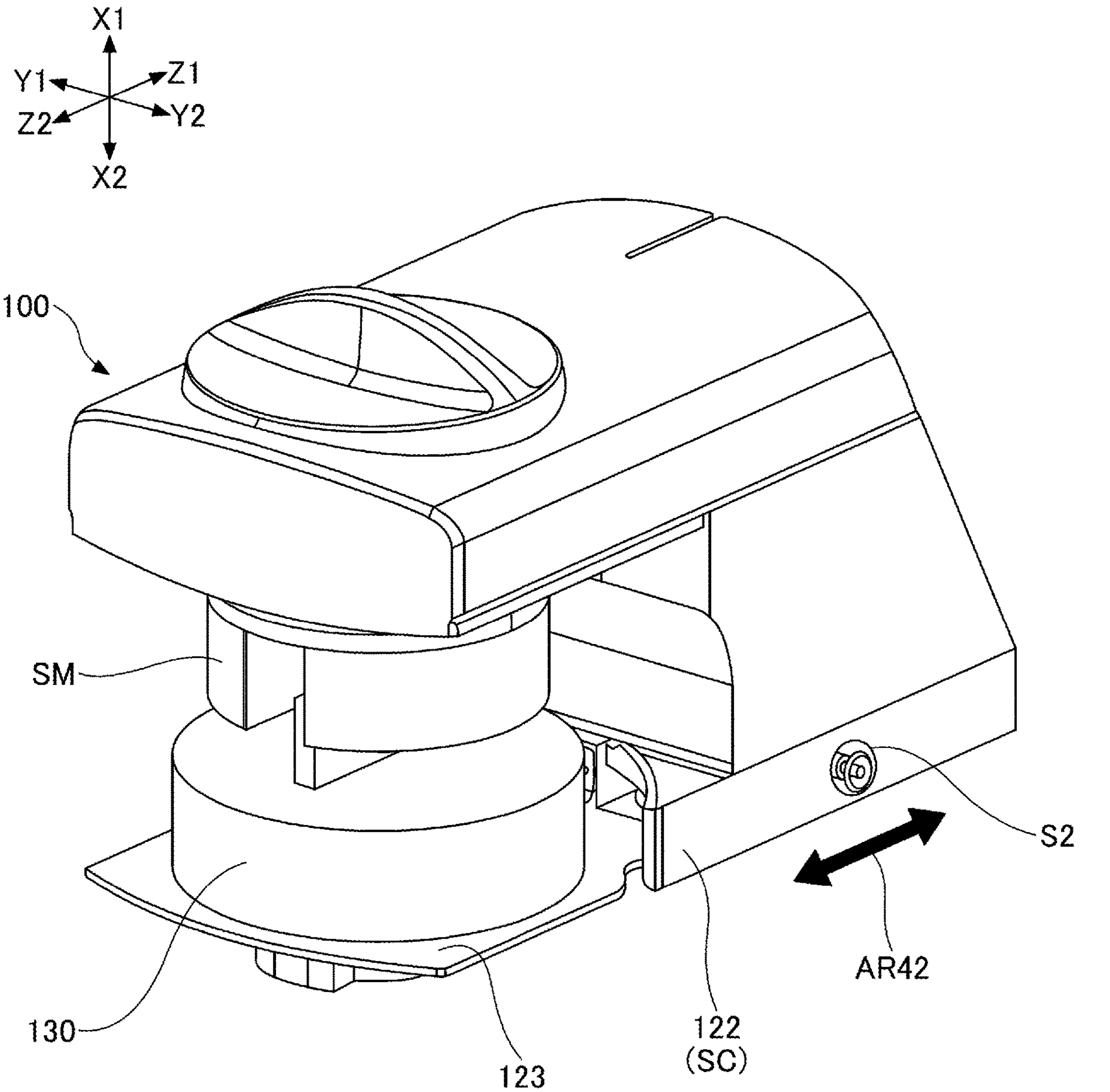
FIG. 12A is a perspective view of another configuration example of the electronic lock unit.
Figure 12B:
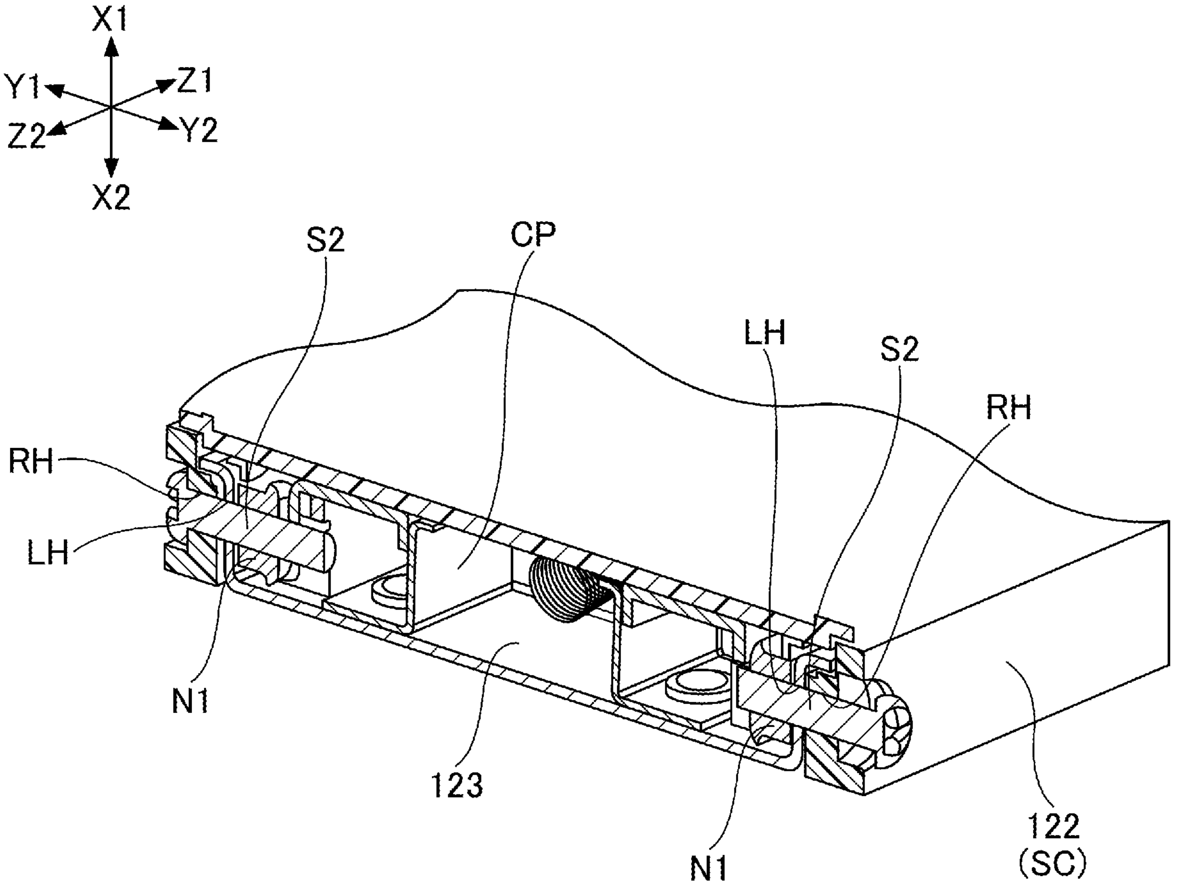
FIG. 12B is a cross-sectional view of another configuration example of the base.

The adjustment mechanism AM will be described with reference to FIG. 11A, FIG. 11B, FIG. 12A, and FIG. 12B. FIG. 11A, FIG. 11B, FIG. 12A and FIG. 12B are diagrams illustrating configuration examples of the adjustment mechanism AM. Specifically, FIG. 11A is a top view of the adjustment plate AP, the base plate 123, a cover plate CP, and the slide cover SC. FIG. 11B illustrates a cross-section of each member in a plane parallel to the XZ plane including a dashed-and-dotted line L4 in FIG. 11A. In FIG. 11B, a compression spring SP illustrated in FIG. 11A is not illustrated for clarity. FIG. 12A is a perspective view of the electronic lock unit. FIG. 12B illustrates a cross-section of each member in a plane parallel to the XY plane including a dashed-and-dotted line L5 in FIG. 11A.

By rotating the screw S3, the operator can move the adjustment plate AP within the cover plate CP in the vertical direction (Z-axis direction) as indicated by an arrow AR41 in FIG. 11B and an arrow AR42 in FIG. 12A. Then, the operator can move the adjustment plate AP so that the claw portion NP1 and the claw portion NP2 are pressed against the inner peripheral surface of the thumb-turn mounting hole TH.

That is, the screw S3, the cover plate CP, and the adjustment plate AP constitute a lead screw mechanism TM3 as the moving mechanism TM for moving the engagement member (the claw portion NP1) in the radial direction of the thumb-turn mounting hole TH. Details of the lead screw mechanism TM3 will be described later.

The effect obtained by adjusting the fixing position of the main body of the electronic lock 100 in the vertical direction (Z-axis direction) is as follows.

When the rotation center axis AX6 of the thumb-turn device 130 and the rotation axis AX7 of the holding mechanism SM (driving unit) are misaligned, the driving load of the driving unit may increase and the life of the batteries may decrease. Further, when such an axis misalignment is significantly large, there is a concern that the thumb-turn device 130 cannot be rotated by the force of the motor.

The hole diameter of the thumb-turn mounting hole TH varies depending on the type of the thumb-turn device 130. However, the operator can mount the electronic lock unit 10A to the thumb-turn mounting hole TH having various hole diameters by moving and adjusting the adjustment plate AP having the claw portion NP1.

Since the position of the claw portion NP2 of the base plate 123 is fixed (not adjustable), the positional relationship between the center of the thumb-turn mounting hole TH and the base plate 123 (the center of a through-hole 123A) changes depending on the size of the hole diameter of the thumb-turn mounting hole TH. When each fixing hole LH (see FIG. 9) of the base plate 123 is configured by one simple round hole (single round hole), the electronic lock 100 (holding mechanism SM) cannot be moved relative to the base plate 123 in the vertical direction (Z-axis direction). This is because the relative position of the electronic lock 100 (the holding mechanism SM) with respect to the base plate 123 is uniquely determined by the position of the fixing holes LH when each fixing hole LH is configured by a single round hole. Accordingly, when the electronic lock unit 10A is mounted to the thumb-turn mounting hole TH having a hole diameter different from the hole diameter of the thumb-turn mounting hole TH when the rotation center axis AX6 of the thumb-turn device 130 and the rotation axis AX7 of the holding mechanism SM (driving unit) coincide with each other, the rotation center axis AX6 of the thumb-turn device 130 and the rotation axis AX7 of the holding mechanism SM (driving unit) are misaligned.

The adjustment mechanism AM is configured to be able to suppress or prevent such misalignment. Specifically, the adjustment mechanism AM includes fixing holes LH which are not simple round holes but slotted holes. Therefore, the operator can slide the slide cover SC in the vertical direction with respect to the base plate 123 so that axis alignment can be performed with respect to the thumb-turn mounting holes TH having various hole diameters.

The same problem as described above occurs, when a knob 132 of the thumb-turn device 130 is provided eccentrically with respect to the main body 133 (corresponding to the base 131 in FIG. 1C) of the thumb-turn device 130, that is, when the knob 132 of the thumb-turn device 130 is mounted to the thumb-turn mounting hole TH so that the rotation center axis AX6 of the thumb-turn device 130 does not pass through the center of the thumb-turn mounting hole TH. The adjustment mechanism AM is configured such that the mounting position of the electronic lock 100 can be adjusted so as to cope with such a problem without increasing variations of the base plate 123, that is, without preparing a plurality of different base plates.

Figure 13A:
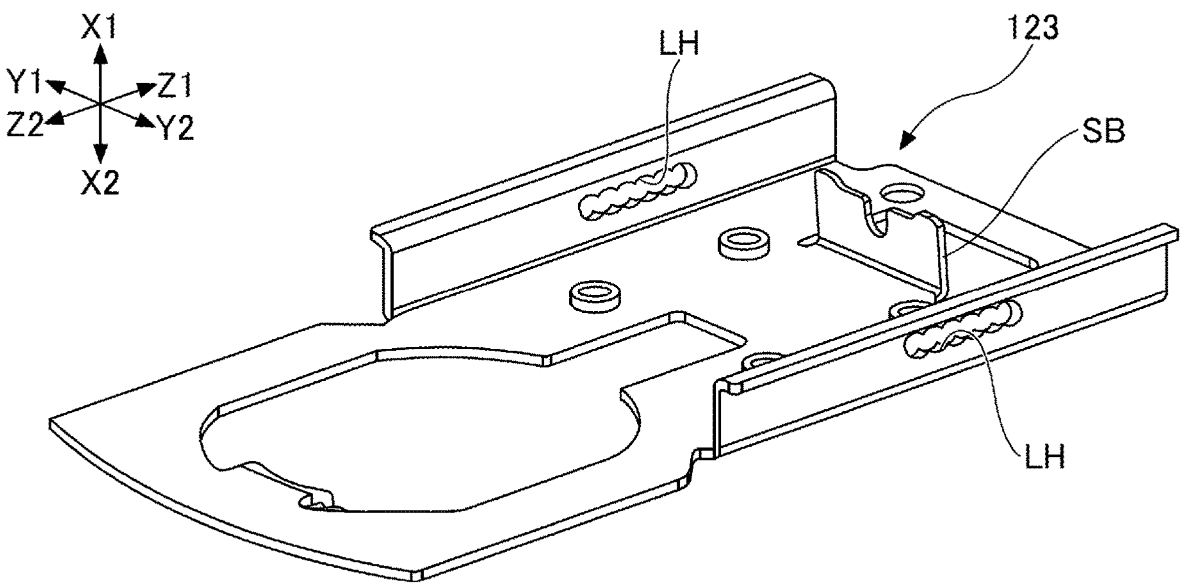
FIG. 13A is a perspective view of another configuration example of the base plate.
Figure 13B:
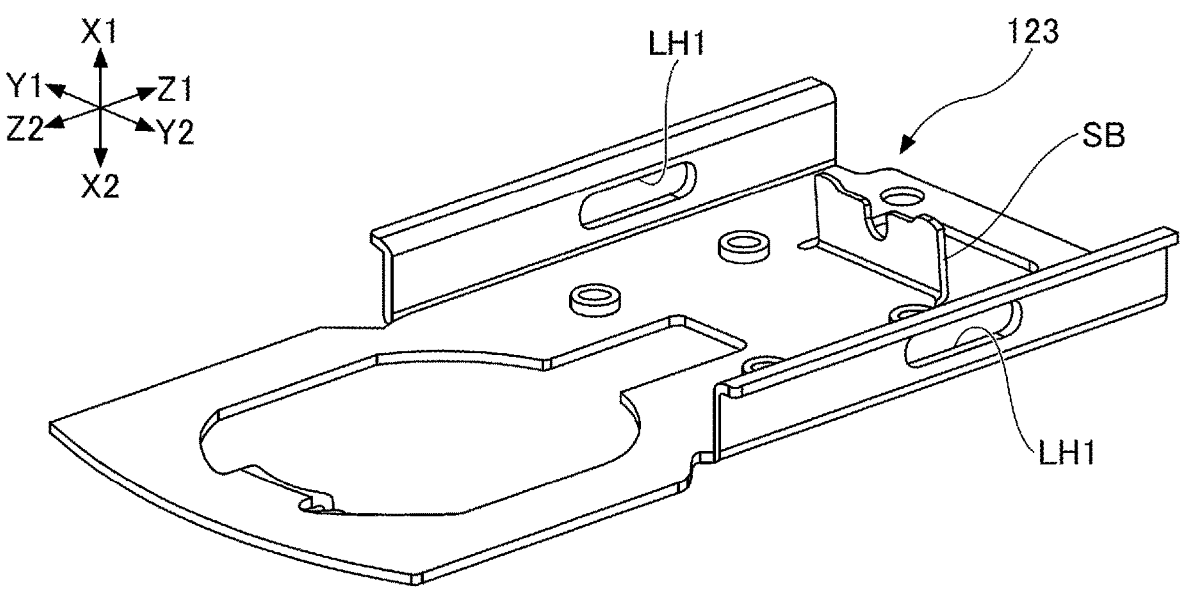
FIG. 13B is a perspective view of yet another configuration example of the base plate.

The fixing holes LH of the base plate 123 will be described with reference to FIG. 13A and FIG. 13B. FIG. 13A and FIG. 13B are perspective views of the base plate 123. Specifically, FIG. 13A is a perspective view of the base plate 123 having fixing holes LH. Each fixing hole LH is an oblong hole formed by connecting a plurality of round holes. FIG. 13B is a perspective view of the base plate 123 having fixing holes LH1 which is a slotted hole.

In order to fix the slide cover SC to the base plate 123 using the screws S2 in a state in which the rotation center axis AX6 of the thumb-turn device 130 and the rotation axis AX7 of the holding mechanism SM (driving unit) coincide with each other, the fixing holes LH through which the respective screws S2 are inserted are formed in the base plate 123. The operator adjusts the position of the main body of the electronic lock 100 assembled to the slide cover SC with respect to the position of the thumb-turn device 130, and then fixes the slide cover SC to the base plate 123 with the left and right screws S2.

Each fixing hole LH illustrated in FIG. 13A is an oblong hole (a hole formed by continuously lined round holes) formed by connecting a plurality of round holes, and each connecting portion where two adjacent holes are connected of the fixing hole LH has a smaller diameter than the screw S2. Therefore, even if the screw S2 is loosened, the screw S2 does not move in the vertical direction (Z-axis direction) in the fixing hole LH. This configuration can prevent the main body of the electronic lock 100 from sliding within the range of the length of the fixing hole LH in the vertical direction (Z-axis direction) when the screw S2 is loosened for some reason such as aging. Therefore, the fixing holes LH can suppress misalignment between the rotation center axis AX6 of the thumb-turn device 130 and the rotation axis AX7 of the holding mechanism SM (driving unit), and can suppress an increase in driving load due to the axis misalignment. The fixing holes LH may be alternatively formed so as to become slotted holes such as the fixing holes LH1 as illustrated in FIG. 13B.

In the example illustrated in FIG. 13B, the slide cover SC is fixed to the base plate 123 not by fitting the screws S2 into the respective fixing holes LH as illustrated in FIG. 13A but by fastening the slide cover SC and the base plate 123 using the screws S2. Thus, the example illustrated in FIG. 13B brings about an effect that the fixing position of the slide cover SC with respect to the base plate 123 can be steplessly adjusted. Note that, in the example illustrated in FIG. 13A, it is configured that the fixing position of the slide cover SC with respect to the base plate 123 can be adjusted in steps.

Each screw S2 (bolt) constituting the adjustment mechanism AM is also configured to engage with a nut N1 fixed to the slide cover SC, for example, as illustrated in FIG. 12B (see also FIG. 8 and FIG. 11A). However, each screw S2 may be configured to engage with a female screw portion integrated with the slide cover SC.

Furthermore, the screws S2 used for fitting with the fixing holes LH illustrated in FIG. 13A may be replaced with pins. In this case, the slide cover SC and the base plate 123 may be fastened by any other fastening members such as clamp mechanisms.

Similarly, the nuts N1 and the screws S2 used for fastening the slide cover SC and the base plate 123 in FIG. 13B may be replaced with other fastening members such as clamp mechanisms.

Furthermore, in the example illustrated in FIG. 13A, the fixing holes LH (holes each formed by continuously lined round holes) are formed in the base plate 123, and through-holes RH (see FIG. 8 and FIG. 12B) which are single round holes for inserting the screw S2 are formed in the slide cover SC. However, the fixing holes LH (holes each formed by continuously lined round holes) may be formed in the slide cover SC. In this case, single round holes through which the screws S2 are inserted may be formed in the base plate 123. Alternatively, the fixing holes LH (holes each formed by continuously lined round holes) may be formed in both of the base plate 123 and the slide cover SC. The same applies to the fixing holes LH1 (slotted holes) illustrated in FIG. 13B.

Figure 14:
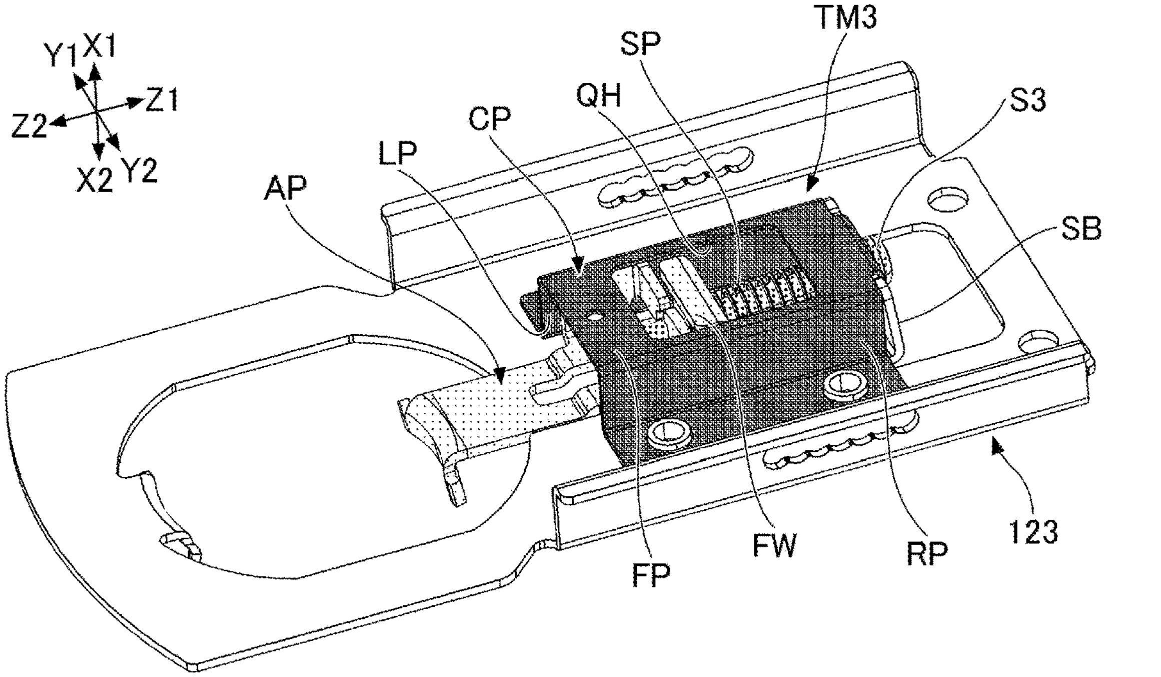
FIG. 14 is a perspective view of the base plate to which a lead screw mechanism is assembled.
Figure 15:
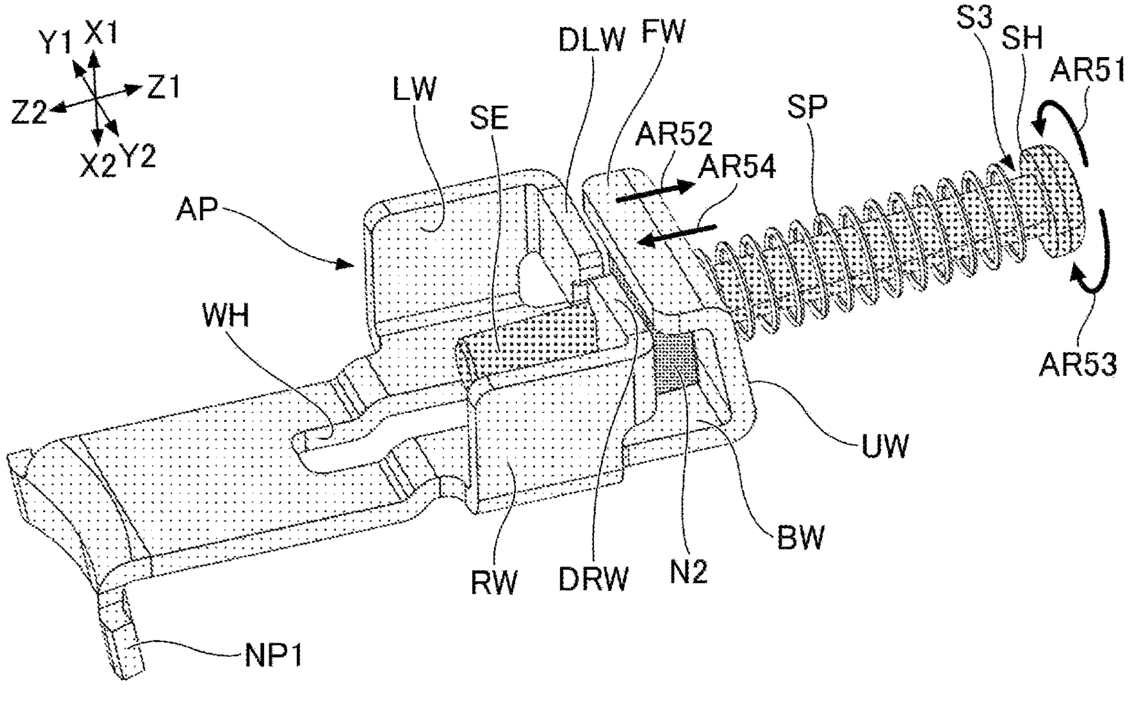
FIG. 15 is a diagram illustrating main parts of the lead screw mechanism.

The lead screw mechanism TM3 will be described with reference to FIG. 14 and FIG. 15. FIG. 14 is a diagram illustrating a configuration example of the lead screw mechanism TM3. FIG. 15 is a view illustrating a main part of the lead screw mechanism TM3 illustrated in FIG. 14. Specifically, FIG. 14 is a perspective view of the base plate 123 to which the cover plate CP, the adjustment plate AP, a slider N2, the screw S3, and the lead screw mechanism TM3 including the compression spring SP are assembled. FIG. 15 is a perspective view of the main part of the lead screw mechanism TM3 illustrated in FIG. 14, and illustrates a state in which the cover plate CP and the base plate 123 illustrated in FIG. 14 are omitted. In FIG. 14, for clarity, a coarse dot pattern is applied to the adjustment plate AP, a fine dot pattern is applied to the screw S3, and a cross pattern is applied to the cover plate CP. Further, in FIG. 15, for clarity, a coarse dot pattern is applied to the adjustment plate AP, a fine dot pattern is applied to the screw S3, and a further fine dot pattern is applied to the slider N2.

The slider N2 is supported by the adjustment plate AP so as to be slidable in the vertical direction (Z-axis direction) and not rotatable about the vertical axis (Z-axis). In the example illustrated in FIG. 15, the slider N2 is a nut having a substantially rectangular parallelepiped shape, and is accommodated in a space surrounded by a front wall portion FW, an upper wall portion UW, a rear wall portion BIN, a lower left wall portion DLW, and a lower right wall portion DRW of the adjustment plate AP. The front wall portion FW is configured to restrict the forward (X1 direction) movement of the slider N2, the upper wall portion UW is configured to restrict the upward (Z1 direction) movement of the slider N2, the rear wall portion BW is configured to restrict the rearward (X2 direction) movement of the slider N2, and the lower left wall portion DLW and the lower right wall portion DRW are configured to restrict the downward (Z2 direction) movement of the slider N2. Further, the front wall portion FW and the rear wall portion BW are configured to be able to restrict rotation of the slider N2 about the vertical axis (Z-axis).

The lower left wall portion DLW is formed by bending an upper portion (the side in the Z1 direction) of the left wall portion LW of the adjustment plate AP rightward (in the Y2 direction), and the lower right wall portion DRW is formed by bending an upper portion (the side in the Z1 direction) of a right wall portion RW of the adjustment plate AP leftward (in the Y1 direction). The front wall portion FW is formed by bending a front portion (the side in the X1 direction) of the upper wall portion UW downward (in the Z2 direction).

The upper wall portion UW is formed by bending an upper portion (the side in the Z1 direction) of the rear wall portion BW forward (in the X1 direction), the left wall portion LW is formed by bending a left portion (the side in the Y1 direction) of the rear wall portion BW forward (in the X1 direction), and the right wall portion RW is formed by bending a right portion (the side in the Y2 direction) of the rear wall portion BW forward (in the X1 direction).

As illustrated in FIG. 14, the screw S3 is configured such that a screw head SH is supported by the upper surface (surface on the side in the Z1 direction) of a support plate SB which is a part of the base plate 123, and is screwed into a female screw hole formed in the central portion of the slider N2. The screw S3 is also disposed in the compression spring SP so as to pass through the compression spring SP.

In the illustrated example, the screw S3 is a metric screw in which a cross hole is formed in the screw head. The operator can slide the slider N2 in the vertical direction (Z-axis direction) within the cover plate CP by rotating the screw S3 screwed into the female screw hole of the slider N2 with the Phillips screwdriver.

The compression spring SP is disposed between the lower surface (surface on the side in the Z2 direction) of the support plate SB which is a part of the base plate 123 and the upper surface (surface on the side in the Z1 direction) of the upper wall portion UW of the adjustment plate AP in a state in which the screw S3 passes through the compression spring SP.

When the screw S3 is rotated in one direction about an axis of rotation, the rotation of the slider N2 is restricted by the front wall portion FW and the rear wall portion BW of the adjustment plate AP, so that the slider N2 slides in a direction (Z1 direction) approaching the screw head SH. This is because the rotational movement of the screw S3 is converted into the linear movement of the slider N2. At this time, the lower surface (surface on the side in the Z2 direction) of the upper wall portion UW is pressed by the slider N2 sliding in the Z1 direction, and the adjustment plate AP moves in the Z1 direction together with the slider N2. The compression spring SP is further compressed because the distance between the support plate SB of the base plate 123 and the upper wall portion UW of the adjustment plate AP is shortened.

When the screw S3 is rotated in the other direction about the axis of rotation, the slider N2 slides in a direction (Z2 direction) away from the screw head SH. At this time, since the upper surface (surface on the side in the Z1 direction) of the upper wall portion UW is biased downward (in the Z2 direction) by the compression spring SP and is pressed against the upper surface (surface on the side in the Z1 direction) of the slider N2, the adjustment plate AP moves in the Z2 direction together with the slider N2.

The compression spring SP can always press the lower surface (surface on the side in the Z2 direction) of the upper wall portion UW of the adjustment plate AP against the upper surface (surface on the side in the Z1 direction) of the slider N2. Therefore, the compression spring SP can cause the movement of the adjustment plate AP to follow the movement of the slider N2 whether the slider N2 moves upward (in the Z2 direction) or downward (in the Z1 direction).

Specifically, the operator can move the slider N2 and the adjustment plate AP in a direction indicated by an arrow AR52 (the Z1 direction) by rotating the screw S3 in the direction indicated by an arrow AR51 in FIG. 15 (the clockwise direction in top view). On the other hand, by rotating the screw S3 in the direction indicated by an arrow AR53 (the counterclockwise direction in top view), the operator can move the slider N2 and the adjustment plate AP in a direction indicated by an arrow AR54 (the Z2 direction).

As illustrated in FIG. 11B, the screw S3 is disposed so as to be inclined with respect to the Z-axis direction. Specifically, the screw S3 is arranged to form an angle α with respect to the Z-axis direction. With this configuration, since the screw head SH of the screw S3 can be inclined forward, there is an effect that the operator can easily perform an operation of rotating the screw S3 about the axis of rotation using a tool such as the Phillips screwdriver. In addition, as compared with the case where the screw S3 is arranged to be parallel to the Z-axis direction, when the slider N2 is brought close to the screw head SH by the rotation of the screw S3 to press the claw portion NP1 against the inner peripheral surface of the thumb-turn mounting hole TH, the force with which the adjustment plate AP is pressed against the surface 20A (see FIG. 8) of the door 20 can be increased. That is, this configuration brings about an effect that the mounting strength of the electronic lock unit 10A to the door 20 can be enhanced.

As illustrated in FIG. 15, the rear wall portion BW of the adjustment plate AP is provided with a through-hole WH at a position corresponding to a tip portion SE of the screw S3. This configuration brings about an effect that the tip portion SE can be prevented from coming into contact with the rear wall portion BW.

As illustrated in FIG. 14, the cover plate CP is provided with a through-hole QH in a front plate portion FP. The through-hole QH is configured to have a width larger than a length in the Y-axis direction (width) of the front wall portion FW of the adjustment plate AP. Further, the through-hole QH is configured to have a length larger than the movable range of the front wall portion FW, in the Z-axis direction. This configuration brings about an effect that it is possible to prevent the front wall portion FW of the adjustment plate AP and the front plate portion FP of the cover plate CP from coming into contact with each other. Specifically, when the slider N2 is moved in the direction approaching the screw head SH of the screw S3, the upper wall portion UW of the adjustment plate AP is pressed and bent in the direction approaching the screw head SH by the slider N2. As a result, even when the front wall portion FW is moved forward (in the X1 direction), the front wall portion FW and the front plate portion FP can be prevented from coming into contact with each other. Therefore, with this configuration, it is possible to reliably prevent that the movement of the adjustment plate AP upward (in the Z1 direction) is prevented because of the contact between the front wall portion FW and the front plate portion FP.

In the illustrated example, the adjustment plate AP is configured such that the distance between the outer surface (surface on the side in the Y1 direction) of the left wall portion LW and the outer surface (surface on the side in the Y2 direction) of the right wall portion RW is slightly smaller than the distance between the inner surface (surface on the side in the Y2 direction) of a left plate portion LP and the inner surface (surface on the side in the Y1 direction) of a right plate portion RP of the cover plate CP. This configuration brings about an effect that when the adjustment plate AP is moved in the Z-axis direction, the moving direction can be prevented from greatly deviating from the Z-axis direction. That is, the cover plate CP can guide the movement of the adjustment plate AP in the Z-axis direction. When the moving direction of the adjustment plate AP deviates from the Z-axis direction, the left wall portion LW or the right wall portion RW of the adjustment plate AP comes into contact with the left plate portion LP or the right plate portion RP of the cover plate CP.

Configuration examples of the engagement mechanism 121 will be described with reference to FIG. 16A1 to FIG. 16A3 and FIG. 16B1 to FIG. 16B3. FIG. 16A1 to FIG. 16A3 and FIG. 16B1 to FIG. 16B3 are bottom views of the engagement mechanism 121. Specifically, FIG. 16A1 to FIG. 16A3 illustrate configuration examples of an engagement mechanism 121A including two claw portions (a claw portion NP1 and a claw portion NP2), and FIG. 16B1 to FIG. 16B3 illustrate configuration examples of an engagement mechanism 1215 including three claw portions (a claw portion NP1, a claw portion NP2, and a claw portion NP3).

More specifically, FIG. 16A1 illustrates the engagement mechanism 121A mounted to a thumb-turn mounting hole TH1 having a predetermined diameter, and FIG. 16B1 illustrates the engagement mechanism 121B mounted to the thumb-turn mounting hole TH1. In FIG. 16A1 and FIG. 16B1, each thumb-turn mounting hole TH1 is indicated by a dashed-and-dotted line for clarity.

FIG. 16A2 illustrates the engagement mechanism 121A mounted to a thumb-turn mounting hole TH2 having a larger diameter than the thumb-turn mounting hole TH1, and FIG. 16B2 illustrates the engagement mechanism 1215 mounted to the thumb-turn mounting hole TH2. In FIG. 16A2 and FIG. 16B2, for clarity, the thumb-turn mounting hole TH1 as a comparison target is indicated by a dashed-and-dotted line, and the thumb-turn mounting hole TH2 is indicated by a broken line.

FIG. 16A3 illustrates the engagement mechanism 121A mounted to a thumb-turn mounting hole TH3 having a smaller diameter than the thumb-turn mounting hole TH1, and FIG. 16B3 illustrates a positional relationship between the thumb-turn mounting hole TH3 and the engagement mechanism 121B. In FIG. 16A3 and FIG. 16B3, for clarity, the thumb-turn mounting hole TH1 as a comparison target is indicated by a dashed-and-dotted line, and the thumb-turn mounting hole TH3 is indicated by a broken line.

The engagement mechanism 121A, which is an example of the engagement mechanism 121, includes a claw portion NP1 formed integrally with the adjustment plate AP and a claw portion NP2 formed integrally with the base plate 123, as illustrated in FIG. 16A1.

The claw portion NP1 and the claw portion NP2 are disposed at an interval of 180 degrees from each other on the circumference of the thumb-turn mounting hole TH1 so as to face each other across the rotation center axis AX6 (see FIG. 11A) of the thumb-turn device 130 in the vertical direction (Z-axis direction).

The claw portion NP1 includes a central portion N1C curved along the circumference of the thumb-turn mounting hole TH1, a left end portion NIL curved outward so as to come into contact with the inner peripheral surface of the thumb-turn mounting hole TH1, and a right end portion N1R curved outward so as to come into contact with the inner peripheral surface of the thumb-turn mounting hole TH. Similarly, the claw portion NP2 includes a central portion N2C curved along the circumference of the thumb-turn mounting hole TH1, a left end portion N2L curved outward so as to come into contact with the inner peripheral surface of the thumb-turn mounting hole TH, and a right end portion N2R curved outward so as to come into contact with the inner peripheral surface of the thumb-turn mounting hole TH1.

The left end portion N1L and the right end portion N1R of the claw portion NP1 may be omitted. In this case, the central portion N1C of the claw portion NP1 has a portion curved outward so as to come into contact with the inner peripheral surface of the thumb-turn mounting hole TH. Further, the claw portion NP1 may be configured like the claw portion CL of the central engagement member 121C illustrated in FIG. 6A and FIG. 6B. The same applies to the claw portion NP2.

The engagement mechanism 121B, which is another example of the engagement mechanism 121, includes a claw portion NP1 formed integrally with the adjustment plate AP, and a claw portion NP2 and a claw portion NP3 formed integrally with the base plate 123, as illustrated in FIG. 16B1.

The claw portion NP1, the claw portion NP2, and the claw portion NP3 are disposed at intervals of 120 degrees on the circumference of the thumb-turn mounting hole TH1.

The claw portion NP1 includes a central portion N1C curved along the circumference of the thumb-turn mounting hole TH1, a left end portion NIL curved outward so as to come into contact with the inner peripheral surface of the thumb-turn mounting hole TH1, and a right end portion N1R curved outward so as to come into contact with the inner peripheral surface of the thumb-turn mounting hole TH. The claw portion NP2 includes a central portion N2C curved along the circumference of the thumb-turn mounting hole TH1, a left end portion N2L curved outward so as to come into contact with the inner peripheral surface of the thumb-turn mounting hole TH, and a right end portion N2R curved outward so as to come into contact with the inner peripheral surface of the thumb-turn mounting hole TH1. Similarly, the claw portion NP3 includes a central portion N3C curved along the circumference of the thumb-turn mounting hole TH1, a left end portion N3L curved outward so as to come into contact with the inner peripheral surface of the thumb-turn mounting hole TH, and a right end portion N3R curved outward so as to come into contact with the inner peripheral surface of the thumb-turn mounting hole TH1.

However, the left end portion N1L and the right end portion N1R of the claw portion NP1 may be omitted. In this case, the central portion N1C of the claw portion NP1 has a portion curved outward so as to come into contact with the inner peripheral surface of the thumb-turn mounting hole TH. Further, the claw portion NP1 may be configured like the claw portion CL of the central engagement member 121C illustrated in FIG. 6A and FIG. 6B. The same applies to the claw portion NP2 and the claw portion NP3.

When the engagement mechanism 121A is mounted to the thumb-turn mounting hole TH1 as illustrated in FIG. 16A1, the engagement mechanism 121A is disposed in the thumb-turn mounting hole TH1 so that the left end portion NIL and the right end portion N1R of the claw portion NP1 are in contact with the inner peripheral surface of the thumb-turn mounting hole TH1, and that the left end portion N2L and the right end portion N2R of the claw portion NP2 are in contact with the inner peripheral surface of the thumb-turn mounting hole TH1.

The same applies to the case of mounting to the thumb-turn mounting hole TH2 as illustrated in FIG. 16A2 and the case of mounting to the thumb-turn mounting hole TH3 as illustrated in FIG. 16A3.

That is, the engagement mechanism 121A is configured to be mounted to any of the three thumb-turn mounting holes having different diameters.

On the other hand, when the engagement mechanism 121B is mounted to the thumb-turn mounting hole TH1 as illustrated in 16B1, the engagement mechanism 121B is disposed in the thumb-turn mounting hole TH1 so that the left end portion N1L and the right end portion N1R of the claw portion NP1 are in contact with the inner peripheral surface of the thumb-turn mounting hole TH1, the left end portion N2L and the right end portion N2R of the claw portion NP2 are in contact with the inner peripheral surface of the thumb-turn mounting hole TH1, and the left end portion N3L and the right end portion N3R of the claw portion NP3 are in contact with the inner peripheral surface of the thumb-turn mounting hole TH1.

Therefore, the engagement mechanism 121B having six point contacts can achieve higher mounting strength than the engagement mechanism 121A having four point contacts.

However, when the engagement mechanism 121B is mounted to the thumb-turn mounting hole TH2 as illustrated in FIG. 16B2, the engagement mechanism 121B is disposed in the thumb-turn mounting hole TH2 so that the left end portion NIL and the right end portion N1R of the claw portion NP1 are in contact with the inner peripheral surface of the thumb-turn mounting hole TH2, the left end portion N2L of the claw portion NP2 is in contact with the inner peripheral surface of the thumb-turn mounting hole TH2, and the right end portion N3R of the claw portion NP3 is in contact with the inner peripheral surface of the thumb-turn mounting hole TH2.

That is, when the engagement mechanism 121B is disposed in the thumb-turn mounting hole TH2, the right end portion N2R of the claw portion NP2 and the left end portion N3L of the claw portion NP3 are not in contact with the inner peripheral surface of the thumb-turn mounting hole TH2, and are in a state of being lifted inward from the inner peripheral surface.

Therefore, in the combination of the engagement mechanism 121B and the thumb-turn mounting hole TH2, the engagement mechanism 121B cannot achieve high mounting strength by six point contacts. Further, in the combination of the engagement mechanism 121B and the thumb-turn mounting hole TH2, the right end portion N2R and the left end portion N3L may interfere with the base 131 of the thumb-turn device 130 as illustrated in FIG. 16B2. Note that, in FIG. 16B2, the outline of the base 131 of the thumb-turn device 130 is indicated by a dashed-and-double-dotted line.

These problems can be solved by configuring the claw portion NP2 and the claw portion NP3 to be pivotable with respect to the base plate 123, as in the left engagement member 121L and the right engagement member 121R illustrated in FIG. 4B.

When the engagement mechanism 121B is mounted to the thumb-turn mounting hole TH3 as illustrated in FIG. 16B3, even if the engagement mechanism 121B can bring the claw portion NP1 into contact with the inner peripheral surface of the thumb-turn mounting hole TH3, the engagement mechanism 121B cannot bring the claw portion NP2 and the claw portion NP3 into contact with the inner peripheral surface of the thumb-turn mounting hole TH3.

For example, when an attempt is made to bring the left end portion N2L of the claw portion NP2 into contact with the inner peripheral surface of the thumb-turn mounting hole TH3, the right end portion N2R of the claw portion NP2 interferes with the edge of the thumb-turn mounting hole TH3. On the other hand, if an attempt is made to bring the right end portion N3R of the claw portion NP3 into contact with the inner peripheral surface of the thumb-turn mounting hole TH3, the left end portion N3L of the claw portion NP3 interferes with the edge of the thumb-turn mounting hole TH3.

This problem can be solved by configuring the claw portion NP2 and the claw portion NP3 to be pivotable with respect to the base plate 123, as in the left engagement member 121L and the right engagement member 121R illustrated in FIG. 4B.

As described above, the engagement mechanism 121A including two claw portions has an effect of being able to more flexibly cope with thumb-turn mounting holes having various diameters compared to the engagement mechanism 121B including three claw portions. That is, the engagement mechanism 121A can flexibly cope with each of a plurality of thumb-turn mounting holes having various diameters even if the engagement mechanism is not provided with any pivotable claw portions.

As described above, as illustrated in FIG. 8 to FIG. 10, the electronic lock mounting structure FS according to the embodiment of the present disclosure is configured to be disposed between the electronic lock 100 and the door 20 in order to mount the electronic lock 100 on the door 20. The electronic lock mounting structure FS includes the engagement mechanism 121 configured to engage with the thumb-turn mounting hole TH provided in the door 20, and the adjustment mechanism AM configured to adjust the mounting position of the electronic lock 100 with respect to the thumb-turn device 130.

With this configuration, the electronic lock mounting structure FS has a unique effect of enabling the electronic lock 100 to be removed from the door 20 without damaging the surface 20A on the indoor-ide of the door 20, and also has additional effects of suppressing misalignment between the rotation center axis AX6 of the thumb-turn device 130 and the rotation axis AX7 of the holding mechanism SM (driving unit) and suppressing an increase in driving load due to the axis misalignment.

As illustrated in FIG. 8, the adjustment mechanism AM may be configured to include the base plate 123, the slide cover SC mounted to the base plate 123 so as to be movable in a direction (Z-axis direction) perpendicular to the rotation center axis AX6 of the thumb-turn device 130, and the fastening members that fasten the base plate 123 and the slide cover SC to each other.

As illustrated in FIG. 8, the fastening members may include the screws S2. Each screw S2 penetrates the fixing hole LH as a first hole provided in the base plate 123 and the through-hole RH as a second hole provided in the slide cover SC.

At least one of the first hole (fixing hole LH) and the second hole (through-hole RH) may be a hole formed by continuously lined round holes or a slotted hole. In the example illustrated in FIG. 13A, each fixing hole LH as the first hole is a hole formed by continuously lined round holes, and in the example illustrated in FIG. 13B, each fixing hole LH1 as the first hole is a slotted hole. Note that each fixing hole LH may be constituted by a plurality of single round holes arranged at intervals from each other.

Furthermore, the electronic lock mounting structure FS may include the moving mechanism TM configured to be able to move at least one of the plurality of claw portions formed to engage with the thumb-turn mounting hole TH in the radial direction of the thumb-turn mounting hole TH. In the examples illustrated in FIG. 11A and FIG. 11B, the electronic lock mounting structure FS includes the lead screw mechanism TM3 as the moving mechanism TM configured to be able to move the claw portion NP1 which is one of two claw portions, the claw portion NP1 and the claw portion NP2, formed so as to engage with the thumb-turn mounting hole TH in the radial direction (Z-axis direction) of the thumb-turn mounting hole TH.

The lead screw mechanism TM3 illustrated in FIG. 11A and FIG. 11B may be replaced with another moving mechanism TM such as the rack-and-pinion mechanism TM1 illustrated in FIG. 4A and FIG. 4B or the lead screw mechanism TM2 illustrated in FIG. 7A and FIG. 7B.

Furthermore, the electronic lock mounting structure FS may include the movement restriction mechanism that restricts moving directions of the claw portions by the moving mechanism TM. For example, in the examples illustrated in FIG. 4A and FIG. 4B, the electronic lock mounting structure FS may include the rack-and-pinion mechanism TM1 as the movement restriction mechanism LM that restricts the moving direction of the claw portion CL of the central engagement member 121C by the ratchet mechanism LM1 which is an example of the moving mechanism TM.

This configuration brings about an effect that it is possible to restrict the downward movement (in the Z2 direction) while allowing the upward movement (in the Z1 direction) of the claw portion CL of the central engagement member 121C. Therefore, this configuration can reliably prevent the claw portion from moving downward and the engagement mechanism 121 from coming off from the thumb-turn mounting hole TH after the engagement mechanism 121 is mounted to the thumb-turn mounting hole TH.

The moving mechanism TM illustrated in each of FIG. 4A, FIG. 4B, FIG. 7A, FIG. 7B, and FIG. 9 may be the lead screw mechanism TM3. In this case, the lead screw mechanism TM3 may include the compression spring SP that biases the claw portion NP1 in one radial direction (in the Z2 direction) of the thumb-turn mounting hole TH.

As illustrated in FIG. 15, this configuration brings about an effect that even when the screw S3 which is a component of the lead screw mechanism TM3 is rotated in any direction about the axis of rotation, the claw portion NP1 can be moved in the Z-axis direction by a distance corresponding to the amount the screw S3 is rotated. That is, it is possible to prevent occurrence of a problem that only the screw S3 moves without moving the claw portion NP1.

Furthermore, as illustrated in FIG. 11A and FIG. 11B, the plurality of claw portions may include a first claw portion (claw portion NP2) and a second claw portion (claw portion NP1) which is movable in a direction (Z-axis direction) perpendicular to the rotation center axis AX6 of the thumb-turn device 130 with respect to the first claw portion (claw portion NP2). In this case, the first claw portion (claw portion NP2) and the second claw portion (claw portion NP1) are desirably disposed so as to face each other across the center of the thumb-turn mounting hole TH. Typically, as illustrated in FIG. 11A and FIG. 11B, the first claw portion (claw portion NP2) and the second claw portion (claw portion NP1) are disposed so as to face each other across the rotation center axis AX6 of the thumb-turn device 130 in the vertical direction (Z-axis direction).

As described with reference to FIG. 16A1 to FIG. 16A3 and FIG. 16B1 to FIG. 16B3, this configuration brings about an effect that it is possible to flexibly cope with each of the plurality of thumb-turn mounting holes TH having various diameters as compared with the configuration including three or more claw portions. That is, this configuration brings about an effect that it is possible to flexibly cope with each of the plurality of thumb-turn mounting holes TH having various diameters.

The preferred embodiment of the present disclosure has been described above in detail. However, the present disclosure is not limited to the embodiment described above. Various modifications, substitutions, or the like can be applied to the above-described embodiment without departing from the scope of the present disclosure. In addition, each of the features described with reference to the embodiment described above may be appropriately combined as long as there is no technical contradiction.

For example, the adjustment mechanism AM illustrated in FIG. 8 may be integrated in the base 120 illustrated in FIG. 4A and FIG. 4B, or may be integrated in the base 120A illustrated in FIG. 7A and FIG. 7B. More specifically, the adjustment mechanism AM illustrated in FIG. 8 may be integrated between the body member 122 and the base plate 123 of the base 120 illustrated in FIG. 4A and FIG. 4B, or may be integrated between the body member 122 and the base plate 123 of the base 120A illustrated in FIG. 7A and FIG. 7B. Furthermore, the adjustment mechanism AM as illustrated in FIG. 8 may be integrated between the attachment 110 and the base 120 or the base 120A.

This international application claims priority to Japanese Patent Application Nos. 2021-020333, filed Feb. 12, 2021, 2021-072205, filed Apr. 21, 2021, and 2021-124163, filed Jul. 29, 2021, the entire contents of which are incorporated herein by reference.

REFERENCE SIGNS LIST

10, 10A Electronic lock unit, 20 Door, 20A Surface, 20B Side end face, 20C Surface, 100 Electronic lock, 110 Attachment, 110C Recessed portion, 120, 120A Base, 120V Projecting portion, 121 Engagement mechanism, 121C Central engagement member, 121HL Left through-hole, 121HR Right through-hole, 121L Left engagement member, 121R Right engagement member, 122 Body member, 122A Through-hole, 122C Recessed portion, 122H1, 122H2 Through-hole, 122T Groove, 122G Recessed portion 122GC Central recessed portion, 122GL Left recessed portion, 122GR Right recessed portion, 123 Base, plate, 123A Through-hole, 123G Recessed portion, 123GL Left recessed portion, 123GR Right recessed portion, 123HL Left through-hole, 123HR Right through-hole, 124 Ratchet wheel, 124C Cylindrical portion, 124E Gear portion, 124R Hole, 125 Ratchet pawl, 125E Tip portion, 125H1, 125H2 Through-hole, 125P Pin, 125R Rear end portion, 126 Ratchet spring, 127 Screw, 128 Caulking pin, 128L Left caulking pin, 128R Right caulking pin, 130 Thumb-turn device, 131 Base, 132 Knob, 133 Main body, AM Adjustment mechanism, AP Adjustment plate, AX1 to AX5 Axis, BW Rear wall portion, CE Edge, CH Cylinder mounting hole, CL Claw portion, CP Cover plate, CT1 Lower end, CT2 Upper end, DB Dead bolt, DLW Lower left wall portion, DRW Lower right wall portion, FS Electronic lock mounting structure, FP Front plate portion, FW Front wall portion, LH, LH1 Fixing hole, LM Movement restricting mechanism, LM1 Ratchet mechanism, LP Left plate portion, LW Left wall portion, N1 Nut, N1C Central portion, N1L Left end portion, N1R Right end portion, N2 Slider, N2C Central portion, N2L Left end portion, N2R Right end portion, N3C Central portion, N3L Left end portion, N3R Right end portion, NP1, NP2, NP3 Claw portion, QH Through-hole, RH Through-hole, RK Rack portion, RP Right plate portion, RW Right wall portion, S1 to S3 Screw, SB Support plate, SC Slide cover, SE Tip portion, SH Screw head, SM Holding mechanism, SP Compression spring, TE1 First tooth, TE2 Second tooth, TE3 Third tooth, TH, TH1 to TH3 Thumb-turn mounting hole, TM Moving mechanism, TM1 Rack-and-pinion mechanism, TM2 Lead screw mechanism, TM3 Lead screw mechanism, UW Upper wall portion, WH Through-hole

The invention claimed is:

1. An electronic lock mounting structure disposed between an electronic lock and a door to mount the electronic lock on the door, the electronic lock mounting structure comprising:

an engagement mechanism configured to engage with a thumb-turn mounting hole provided in the door and to be secured to the door through the thumb-turn mounting hole by a thumb-turn device, the engagement mechanism including:

a plurality of claw portions configured to engage with the thumb-turn mounting hole, and a moving mechanism configured to be able to move one of the plurality of claw portions in a radial direction of the thumb-turn mounting hole, wherein the moving mechanism is a rack-and-pinion mechanism or a lead screw mechanism.

2. The electronic lock mounting structure according to claim 1, further comprising:

a movement restriction mechanism configured to restrict a moving direction of the one claw portion moved by the moving mechanism.

3. The electronic lock mounting structure according to claim 1, wherein the plurality of claw portions is arranged at equal intervals in a circumferential direction of the thumb-turn mounting hole.

4. The electronic lock mounting structure according to claim 1, wherein the one claw portion is configured to be engaged with an edge on a rear side of the thumb-turn mounting hole.

5. The electronic lock mounting structure according to claim 1, further comprising:

an adjustment mechanism configured to adjust a mounting position of the electronic lock with respect to the thumb-turn device.

6. The electronic lock mounting structure according to claim 5, wherein the adjustment mechanism includes:

a base plate;

a slide cover mounted to the base plate so as to be movable in a direction perpendicular to an axis of rotation of the thumb-turn device; and fastening members configured to fasten the base plate and the slide cover to each other.

7. An electronic lock mounting structure disposed between an electronic lock and a door to mount the electronic lock on the door, the electronic lock mounting structure comprising:

an engagement mechanism configured to engage with a thumb-turn mounting hole provided in the door and to be secured to the door through the thumb-turn mounting hole by a thumb-turn device; and an adjustment mechanism configured to adjust a mounting position of the electronic lock with respect to the thumb-turn device, and including a base plate;

a slide cover mounted to the base plate so as to be movable in a direction perpendicular to an axis of rotation of the thumb-turn device; and fastening members configured to fasten the base plate and the slide cover to each other, wherein the fastening members include a screw passing through a first hole provided in the base plate and a second hole provided in the slide cover.

8. The electronic lock mounting structure according to claim 7, wherein at least one of the first hole or the second hole is a hole formed by continuously lined round holes or a slotted hole.

9. An electronic lock mounting structure disposed between an electronic lock and a door to mount the electronic lock on the door, the electronic lock mounting structure comprising:

an engagement mechanism configured to engage with a thumb-turn mounting hole provided in the door and to be secured to the door through the thumb-turn mounting hole by a thumb-turn device;

an adjustment mechanism configured to adjust a mounting position of the electronic lock with respect to the thumb-turn device; and a moving mechanism configured to be able to move one of a plurality of claw portions configured to engage with the thumb-turn mounting hole, in a radial direction of the thumb-turn mounting hole.

10. The electronic lock mounting structure according to claim 9, wherein the moving mechanism is a lead screw mechanism, and includes a compression spring configured to bias the one claw portion in one of radial directions of the thumb-turn mounting hole.

11. The electronic lock mounting structure according to claim 9, wherein the plurality of claw portions includes a first claw portion and a second claw portion that is movable with respect to the first claw portion in a direction perpendicular to an axis of rotation of the thumb-turn device, and wherein the first claw portion and the second claw portion are disposed to face each other across a center of the thumb-turn mounting hole.

* * * * *